(12) United States Patent
Schaaf

(10) Patent No.: US 7,686,396 B2
(45) Date of Patent: Mar. 30, 2010

(54) METHOD AND APPARATUS TO ENHANCE PROPRIOCEPTION AND CORE HEALTH OF THE HUMAN BODY

(75) Inventor: Horst Schaaf, Bellingham, WA (US)

(73) Assignee: Corewerks, Inc., Bellingham, WA (US)

( * ) Notice: Subject to any disclaimer, the term of this patent is extended or adjusted under 35 U.S.C. 154(b) by 492 days.

(21) Appl. No.: 11/610,724

(22) Filed: Dec. 14, 2006

(65) Prior Publication Data
US 2008/0079301 A1 Apr. 3, 2008

Related U.S. Application Data

(60) Provisional application No. 60/827,638, filed on Sep. 29, 2006.

(51) Int. Cl.
*A47C 1/00* (2006.01)
(52) U.S. Cl. ........................ 297/313; 297/314
(58) Field of Classification Search .................. 297/312, 297/313, 314, 300.2, 302.4
See application file for complete search history.

(56) References Cited

U.S. PATENT DOCUMENTS

| | | | |
|---|---|---|---|
| 2,799,323 A | 7/1957 | Berg | |
| 4,384,741 A | 5/1983 | Flum | |
| 4,413,693 A | 11/1983 | Derby | |
| 4,605,334 A * | 8/1986 | Kalvatn | ........................ 297/314 |
| 5,769,492 A * | 6/1998 | Jensen | ..................... 297/314 X |
| 6,413,194 B1 | 7/2002 | Gant | |
| 6,595,586 B2 * | 7/2003 | Brightbill et al. | ........ 297/312 X |
| 6,685,268 B2 | 2/2004 | Meyer | |
| 6,688,689 B1 * | 2/2004 | Thorn | ......................... 297/314 |
| 6,866,340 B1 | 3/2005 | Robertshaw | |
| 7,100,983 B1 | 9/2006 | Gant | |

* cited by examiner

*Primary Examiner*—Anthony D Barfield
(74) *Attorney, Agent, or Firm*—Christensen O'Connor Johnson Kindness PLLC

(57) ABSTRACT

A device to actively enhance proprioception and core strength of its user consisting of a motion control system providing a tilt plate that is dampened with a suspension system to provide a system to deliver an exercise regimen that automatically detects and strengthens core muscles in an unobtrusive manner by allowing the individual to move freely while seated. The device can be configured into a chair, stool, wheelchair seat insert, vehicle or airplane seat or exercise device generically known as balance board. The device is intended to enhance the user's proprioception core strength, sense of balance, and overall physical well being.

26 Claims, 27 Drawing Sheets

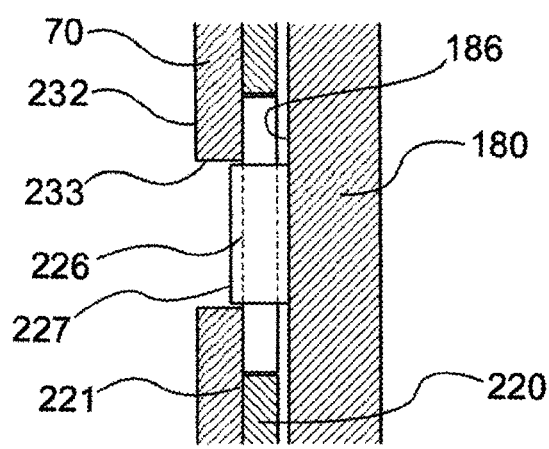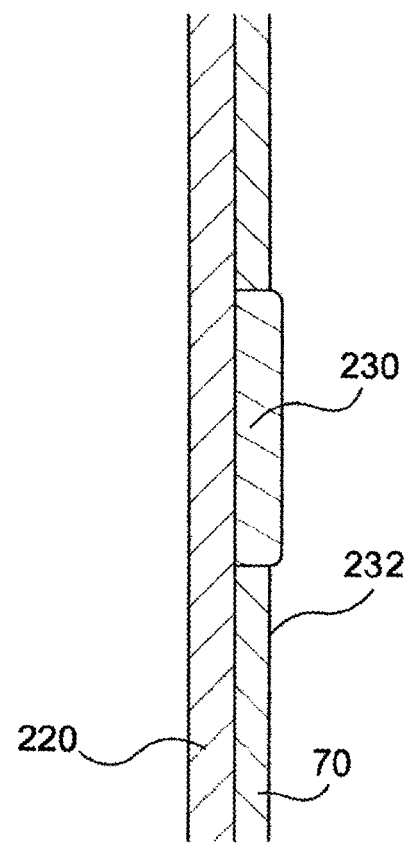

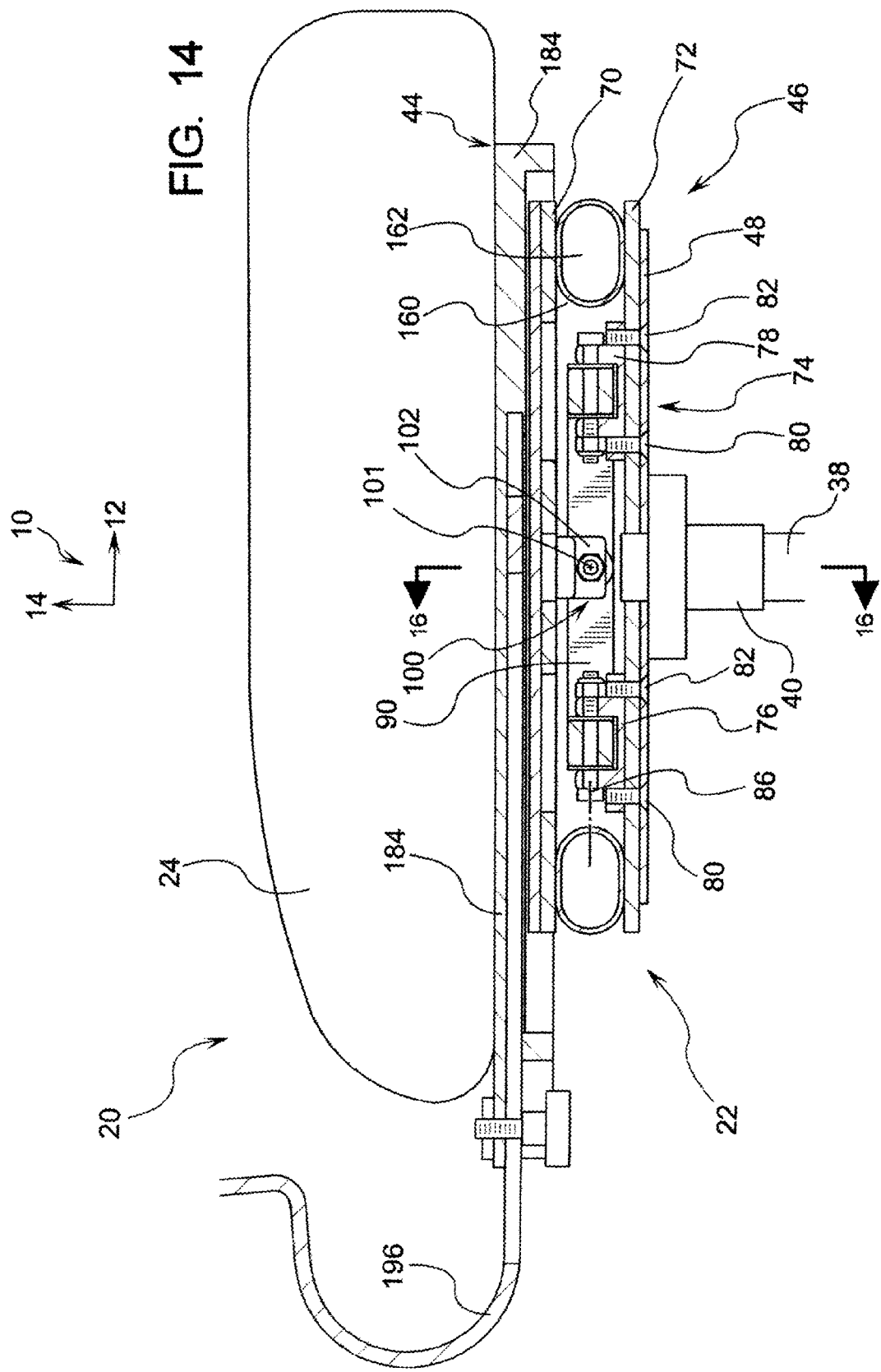

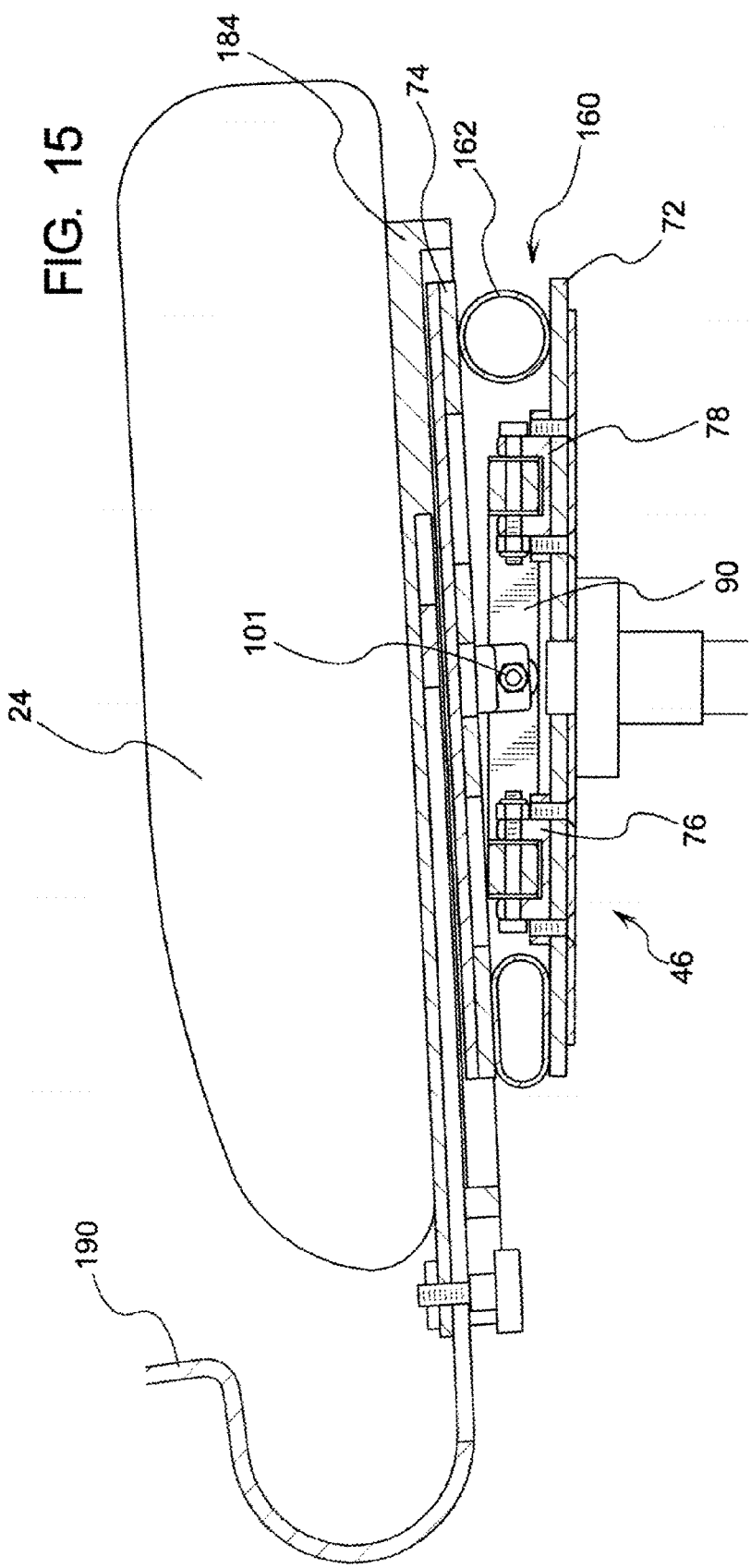

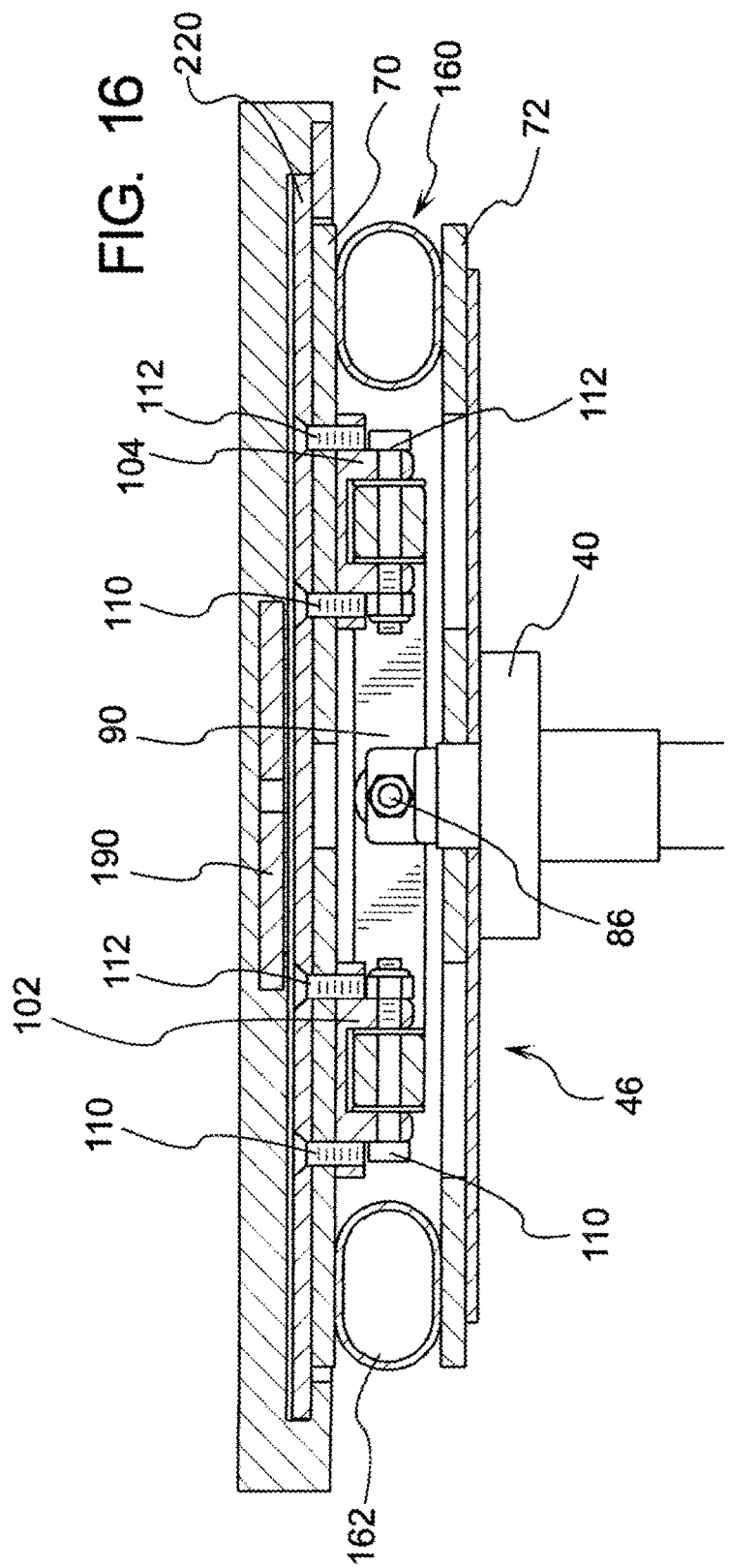

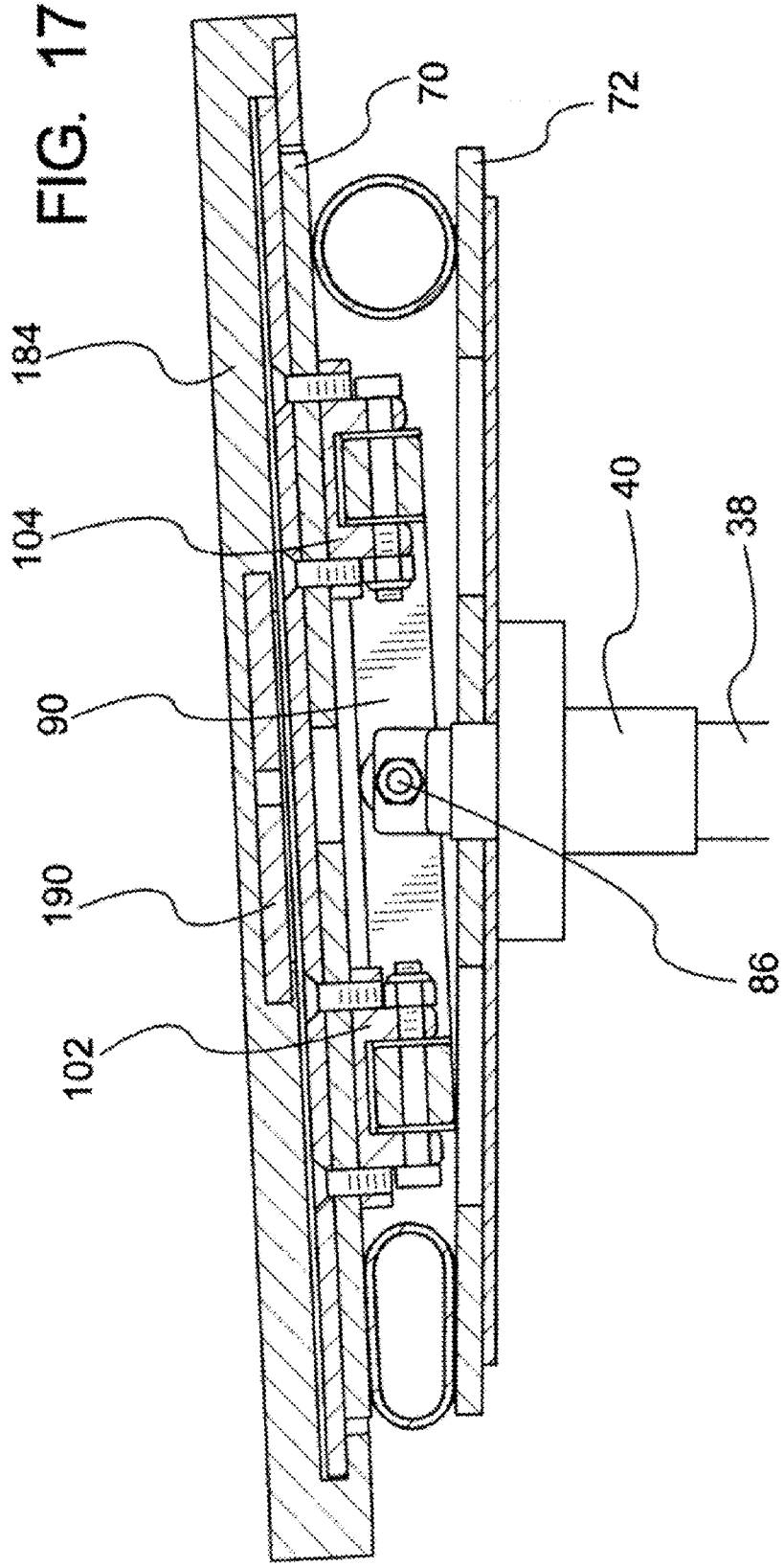

METHOD AND APPARATUS TO ENHANCE PROPRIOCEPTION AND CORE HEALTH OF THE HUMAN BODY

RELATED APPLICATIONS

This application claims priority of U.S. Ser. No. 60/827,638, filed Sep. 29, 2006.

BACKGROUND OF THE DISCLOSURE

Therapeutic dynamic seating devices that deliver musculoskeletal training to the sitter have been disclosed in various forms in the prior art. Oftentimes it is desirable to have a non-static orientation of a seating plane to provide the human body with a platform that will reposition a certain amount. Oftentimes, as described herein below, a properly designed dynamic seating system providing a non-static support has the unexpected advantage of allowing a body to readjust in a more bio-mechanically naturally aligned orientation. For a non-static seating arrangement to deliver the maximum therapeutic benefits to the sitter it will have to entice the sitter to actively participate in the sitting process. Active participation means that the seating system encourages the sitter's neuromuscular system to assume a dynamic posture by itself. Forcing active participation through periodic external movement of the seat as is done in passive dynamic seating will cause the body to fight the seat movement as an intrusion and defeat the benefits gained by the dynamic environment. For an active system to work properly it will have to detect the movement of the sitter and apply a modulation with the proper phase relationship between the sitter's movement and the seat modulation to the seat. This mechanism is known as a phaselocked loop servo system. Also the amplitude of the external modulation must be small enough that the sitter's neuromuscular system does not consider the movement as intrusive.

Other devices, such as regular seating members, provide a substantially horizontal surface, or a surface that is at least horizontal in the lateral direction with respect to the hips of the individual sitting thereon. This sitting arrangement provides a static sitting environment for the user. Neurological research has shown that proper posture can only be achieved if the sitter is allowed to move in both the lateral and transverse direction to properly activate the proprioceptive system of the sitter in a way similar to the movement experienced during horseback riding, which activates both the vestibular as well as the kinesthetic muscle sensors. Continuous movement triggering the deep layer muscles along the spine that are connecting individual vertebrae to "fire" afferent nerve signals to the cerebellum is responsible in conjunction with inputs from the vestibular and vision sensors, for the maintaining of a healthy posture. The internal stabilizers, i.e., the deep layer muscles along the spine must be strengthened before any healing of a back injury can take place. If the deep layer muscles are not firing properly further injury to the back will result. The exercises to the deep layer muscles are very specific and must lead to a symmetric activation without the activation of the large outer layer muscles.

Static sitting postures will lead to lower back pain (as anybody who has sat confined to an airplane seat for a long distance flight can attest to) and eventually back injuries like bulged discs and sciatica as well as pressure ulcers when the individual is bound to the sitting surface as is the case in wheelchairs. This negative consequence of a static seating device is more detrimental to the sitter when the sitter is afflicted with a neuro-muscular impairment like cerebral palsy. Devices such as gym balls (also referred to as Swiss balls), which generally are rather large balls of approximately 2 feet (or more) in diameter and filled with air, are utilized sometimes to provide a non-static/non-stable environment to sit upon. However, in general, while sitting upon these devices, the contact point functions as a possible initial point of rotation, and the sitting point is generally at the apex to this contact point in the upper region. Sitting on such a device feels like sitting on a stick with the pivoting point at the ground. This type of configuration does not mimic the dynamics of therapeutic horseback riding and is therefore limited in its ability to deliver the desired therapeutic benefits that are associated with hippo/equestrian therapy. Hippotherapy delivers continuous triggering of the deep layer muscles along the spine, proprioceptors, and also triggers the vestibular system for proper stabilizing action by the cerebellum as well as the sensorimotor cortex in the human brain.

In order for the information from the proprioceptors and the vestibular system to reach the sensorimotor cortex it must pass the gate keeper for the cortex, the hippocampus, and be judged as safe. If the information does not feel safe, the hippocampus activates the lower brain and sets up the fight or flight mode, in which only a limited amount of information gets registered by the cortex. The fight or flight mode gets triggered when, in the case of a dynamic seating system, the sitter has the feeling of falling over or losing balance.

Anyone who has sat on such device, meaning a ball-based chair or stool design or a device with an improperly designed dynamic coupling between the seat and the post of a chair, can attest that these devices feel unsafe to the user and leave the user focusing on the task of not falling over. Unfortunately, when shifting left or right, the further one travels from this center orientation, the further the user is dropping and hence there is a greater amount of rotational force exerted on the individual to continue rotating in this off-centered direction. In other words, the greater distance from the contact point of the ball to the ground to the actual sitting engagement region can cause a sideward rolling action. This sideward rolling will cause the entire upper body to shift sideward adding the need for the sitter to move the entire upper body back to centerline instead of having the body tilt just around the midline of the spine as is desirable and achieved when the pivot point is in direct contact with the pelvis, as is done when sitting on a horse, and provide the necessary input for the proper functioning of the proprioceptive system.

Using a ball as therapeutic device for individuals suffering from cerebral palsy (a sensory input dysfunction caused by brain injury) induced scoliosis will cause the sitter to use more of his/her non-affected neuromuscular system to compensate for the inactivity of the impaired part to stay balanced, i.e., he/she will lean even more into his/her curve, create an even tighter muscle tone because of fear to fall over. This approach will aggravate an already fragile situation even further.

In contrast, a properly designed dynamic seating system as described herein will place the sitter's pelvis into direct contact with the axis of rotation and use a joint technology that will make the sitter feel safe and wanting to move instead of being afraid of losing balance. Under such conditions the sitter will stay relaxed and "wiggle" his/her pelvis creating the desirable afferent nerve signals arising from the deep layer muscles along the spine that are required for a healthy posture.

With regard to a properly designed dynamic seating system, as described herein the sitter can assume a posture that allows him/her to most effectively compensate for the forces of gravity without the excessive use of the large outer layer muscles. In the case of scoliosis the seat will rotate slightly into the direction of the sitter's primary curve allowing for a more relaxed secondary and tertiary (where applicable) compensatory curve resulting in a much more erect sitting posture. This more erect sitting posture leads to a reduction in the wedging of the spinal discs and therefore less pinching of the nerves in the compressed region. Further, present analysis indicates that the overall curve of a spine with an individual having scoliosis is reduced, because the sitter can find his/her center of gravity more easily and therefore does not have to overcompensate as strongly as when sitting on a flat surface. Present analysis has also found that utilizing the device as described herein has the effect of improving posture and sense of balance for the seated individual, able-bodied or disabled alike, because it successfully triggers both the proprioceptors along the spine and the sensors of the vestibular system in a safe manner, such that the sensorimotor cortex receives meaningful information which it can process.

In addition to side-to-side tilting the seat also has to tilt in the anterior/posterior direction, to allow the angle between chest and femur to open up and to reduce the extension of the hamstrings. A relative angle of 90° and smaller will stretch the hamstrings too much and lead to a backward pull on the spine, causing it to go into a C-shape and causing pinching at the front end of the discs. Providing a system where the hips are allowed to tilt forward about a lateral axis provides a more desirable pressure distribution upon the lumbar vertebrae. As described herein, the system is designed to adapt to a users' physiology, allow the user to sit with a more upright posture and to "wiggle" his/her pelvis for better proprioception. Placing the axis of rotation closer to the pelvis enables the user to tilt his/her pelvis in a manner that does not require a conscious effort on behalf of the sitter and the use of the large outer layer muscles to stay balanced and therefore to obtain a posture that is well balanced within the individual's physiological framework, and therefore enables the user who is afflicted with, say, scoliosis to obtain a better balanced posture with an overall reduced curvature of the spine.

Using the same device mechanism in the embodiment of an exercise device called balance board can be used for rehabilitation injuries of the lower extremities, like foot, ankle, knee or hip injuries and the regaining of a sense of balance periods of immobility.

SUMMARY OF THE DISCLOSURE

Disclosed below is a method of improving the proprioception, and associated with it the balance and posture of an individual with a mechanical device that mimics the dynamics of therapeutic horseback riding/equestrian therapy. Improved proprioception results in improved sense of balance and a better and healthier posture. It also eliminates the causes for poor sitting posture related back pain. To mimic the dynamics of horseback riding the method uses a specially designed joint mechanism that allows for an omni-directional tilt out of a neutral/horizontal plane associated with a nonlinear dynamic restoring force that gives the user the feeling of an edge to the tilt. This design of an adaptive joint triggers the limbic system of the user's brain in such a way that the user feels completely safe when sitting on a tiltable sitting platform. As mentioned above, the feeling of being safe is important for the information to pass through the gatekeeper to the cortex, the hippocampus, and reach the sensorimotor cortex for processing and sensory-motor integration.

Not using the design principles underlying the dynamic seat will result in the feeling of being unsafe for the sitter and a tightening up of the sitter's overall muscle tone and conscious efforts to maintain a balanced posture. The seating system assembly has a motion control assembly where the motion control assembly comprises a pivot bar having a seat pivot attachment attached thereto and pivotally attaching the pivot bar to a seating region. The pivot bar further has a base pivot attachment positioned at a substantially orthogonal orientation to the attachment of the seat pivot attachment. A base pivot attachment is attached to a support structure.

The method further provides a rotational dampening system to resist rotation about a longitudinal and lateral axis of the motion control assembly. It also provides an upper surface of the seat portion and a method of positioning the individual thereon. The individual's center of gravity is positioned substantially above an intersection of a center of rotation of the base pivot attachment and the seat pivot attachment, allowing the pelvis of the sitter to enable the sitter's muscular system to assume a configuration adapted to the sitter's particular needs without assistance of the outer layer muscles to provide balance.

Finally, the method provides a restoring force for rotation about the longitudinal and lateral axis to provide a sense of security for the sitter, to allow the limbic system of the sitter to not interfere with the natural balancing process of the autonomous proprioceptive nervous system of the sitter.

In one embodiment the above noted method comprises a therapeutic chair comprising a support structure having a support foundation. There is further a seat region having a seat region, the seat region having an upper seating surface. A seat repositioning system is used having a pivot bar pivotally attached at a first location about a first axis to the support foundation.

A seat pivot attachment is pivotally attached to the pivot bar at a second axis substantially orthogonal to the first axis, the seat pivot attachment attaching the pivot member to the seat region. Finally, in one form, a dampening system is utilized to dampen rotation past the leveled point of the seat region with respect to the support foundation.

The technology described herein is designed to strengthen the users core muscles in a symmetric fashion through providing an environment that adapts to the users' physical needs and delivering an exercise regimen that automatically strengthens core muscles that need strengthening.

Some of the benefits include enabling the users to exercise their core muscles in an unobtrusive manner while being seated by allowing the user to move freely as was intended by nature. Further the system does not assume or require any skill level, but rather it adapts to the users' physical skill levels such that the users feel safe and can perform tasks to their best ability without diverting energy to the act of sitting. The system entices the user's limbic system to feel safe. This is the optimum physical condition for best volitional control over the neuromuscular system and the acquisition of new skills. Finally the system adapts to the user's particular physical needs not forcing him/her to adapt to assumed ideal situation.

The seating mechanism adapts to the users' needs and provides them with an environment that enables (instead of forcing) them to assume a well balanced posture by enabling the user to be in control of the situation. On the other hand, enforcing means the system is in control and forces the user to adhere to preconditioned standards, a situation which is perceived as an intrusion and consequently fought by the sitter's neuromuscular system.

Leaving the user's limbic system with the impression that the environment is safe will result in a relaxed overall muscle tone which is essential for better volitional control of the muscles. Feeling safe ends up in feeling confident and trust in one's own capabilities and skills. The condition of feeling safe is especially important for individuals suffering from neuro-muscular impairments. These impaired individuals usually exhibit extreme muscle tone since they do not feel in control of their environment By way of background, the human posture is controlled by a neuromuscular servo system consisting of inputs from muscle sensors along the spine, the vestibular system and the visual system. Neuromuscular, like any electromechanical, servo systems must receive a continuous stream of input signals (called error signals in technical jargon) to work properly and let the user assume a healthy posture. This need for a continuous flow of afferent nerve signals (the required error signals mentioned above) from "motion sensors", muscle sensors and the vestibular system, in the human body requires that the human body is in a perpetual state of motion, with minute muscle movements creating the needed afferent nerve signals. Therefore a healthy posture is one which lets the user stay in motion. A static and assumed ideal posture is unhealthy since it does not provide the necessary input for the "neuro-muscular servo" and for the sensorimotor cortex to work properly.

For example, the habit of fidgeting when seated in a traditional chair is the results of the body's need for input/error signals for the neuromuscular servo loop. Additionally static postures lead to a static pressure distribution on the discs, which is in the ideal case evenly spread. Most postures however lead to an uneven pressure distribution and therefore bear the potential of future nerve damage caused by first wedging and then with time bulging of the discs. Based on these conditions, the assumed sitting posture should entice not force the user to assume an erect posture with an angle between femurs and chest of larger than 90°, and keep the muscles around the spine in state of ongoing extension and flexion to enhance the nutrient flow into the discs because of the pressure differentials between the adjacent vertebrae and to provide the required afferent nerve signals from the proprioceptors. Better hydration of discs generally results in less disc shrinkage and greater disc health. Some noted benefits of the system shown herein include:

Exercise of the sitters' core muscles, which results in:
  better posture
  elimination of poor posture induced back pain
Balancing of antagonist/agonist relationship around joints
Relaxation of overworked muscles due to poor posture
Relaxation of overall muscle tone and increased volitional muscle control
System must adapt to user's physiology and skill level
System cannot force user to assume preconceived optimum posture One goal of the seating apparatus is to enable the neuromuscular system to become stronger in such a way that it can assume a balanced posture, similar to what is done in Feldenkrais Therapy, and further entice the body's own neuro-muscular system to assume a posture that is optimal for the user's particular physiological conditions.

It should be noted that the body must want to assume this posture, it cannot be forced or coerced. Forcing a posture results in the body resisting the desired action. Also, overly supporting or confining results in weakening of the muscles (i.e. muscle atrophy) because the sensors in the muscles are not sending any nerve signals to the sensorimotor cortex and therefore are not being recognized by the brain as parts of the body and therefore neglected.

In addition to static pressure on the intervertebral discs a static seating system also causes static pressure on the skin beneath the ischial tuberosities and can cause skin breakdown in the form of pressure ulcers. A dynamic seating system prevents this painful and costly problem.

While providing the desirable dynamic seating environment, a ball or universal joint type joint technologies result in the body exhibiting the undesirable fight/flight mechanism which is controlled by the reptilian part of the human brain and leads to tense overall muscle tone and reduced volitional muscle control. The reptilian brain when triggered takes control over the body and partially shuts down the decision making cortex. Therefore ball sitting is also inferior to conventional sitting since it distracts brain energy away from the task at hand.

In one form the pivot control system is a Gimbal joint where the axes of rotation are clearly separated and arranged on a plane at 90° to each other. If the supported object is located in the plane formed by the rotation axes the joint is well balanced and stable. If the object protrudes out of the plane defined by the axes of rotation, it creates a lever arm. Present analysis indicates that the length of the lever arm determines the amount of instability which has been created. Based on this lever arm concept, if the lever arm protrudes downward, the object sits below the plane defined by the axes of rotation, the system increases in stability, similar to sitting on a swing. Using this ladder approach eliminates the need for a dampening/restoring system, which is required when the object protrudes out of the plane, due to the instability of the upward protruding system.

The embodiments disclosed below provide for a joint that delivers the desirable characteristics described above is created through the use of a Gimbal joint together with a properly adjustable suspension system. The dynamic assembly provides the ideal environment for the learning of new neuromuscular skills, because it:
  is safe, since it enables the user to control the instability,
  follows the user's movements,
  delivers safe angular tilt around two well defined axes of rotation, and
  allows the orthogonal axes to be addressed independently.

The adjustable dampening system allows the user to set the suspension feedback of the joint such that the dynamics of the joint are meeting the user's skill level and do not create a feeling of being unsafe or losing balance. As soon as the user feels unsafe the system transitions into a ball like behavior for the user, i.e. the control shifts from the user to the system.

A properly designed dampening system should increase in its restoring force the further the system is rotated out of its equilibrium state. The dampening system can provide an edge like feeling to give the user the impression that he/she never can exceed their skill level and lose balance. Properly designed suspension volumes preferably use an inflatable closed volume of air or any other compressible media contained in an elastic enclosure. In one form, the elastic volume is enclosed by a half shell type enclosure of flexible material which works as the basic spring for the system. The stiffness of the enclosure material sets the basic spring strength of the suspension. The inflatable elastic volume enables the increase of the spring strength until complete stiffness or immobility of the joint is achieved. Therefore the system never approaches a completely unstable system.

The suspension system described herein provides for a very fluid response similar to viscous damping with increasing spring strength the further the elongation out of the neutral position and a safe edge like behavior when the tilt approaches the limits of the tilt.

This viscous like feedback of the suspension system promotes the desired neuromuscular response because it positively affects the limbic system and creates a feeling of being safe and therefore leads to a relaxed overall muscle tone which enables a greater volitional control over the outer layer muscles of the musculoskeletal system.

A different embodiment of the suspension can consist of 4 separate bladders that are interconnected in pairs. The bladders are located at equal distance from the orthogonal rotation axes just outside the Gimbal joint. Using a small pump connecting bladder pairs it is possible to generate a small pressure oscillation between the 2 connected bladders of a pair. Sensing the phase and frequency of the user's craniosacral pulse and tuning the frequency of the oscillation to alpha, beta or theta waves of the brain and applying it under proper phasing conditions to the pump will allow the user to transition into a state of relaxation or full concentration depending on the frequency selected.

Other embodiments of the dampening system can be employed in various forms. For example torsion springs around shafts extending through the orthogonal rotation axes forcing the seat back into the leveled position when the user tilts away from neutral located either inside or outside the circumference of the Gimbal ring. Further, spiral springs connected to the stationary and the tilt plate located either at the location of the bearings or rotated by 45° out of the axes located inside or outside the circumference of the Gimbal ring to provide and evenly distributed force so that the seat is directed back into the leveled position when the user is tilting the seat. A closed volume containing a viscous fluid to provide a tilt sensitive restoring force either located inside the Gimbal ring or surrounding it along its circumference.

In one possible embodiment of the device a sliding mechanism is installed between the motion control assembly of the device and the actual seating surface. This sliding mechanism enables the sitter to assume the best sitting posture right above the transverse rotation axis independent of the length of the sitter's femurs relative to the length of the seat. By sliding the seat front and aft over the transverse rotation axis the sitter can attain the most appropriate sitting posture, leading to the optimum loading of the discs and elimination of back pain. Sitting in front of the rotation axis lowers the femurs relative to the ischial tuberosities and creates s-shaped spine. An over exaggeration of the S-shaped spine can create pinching on the rear edge of the disc.

Sitting behind axis of rotation raises the femurs relative to the ischial tuberosities and leads to C-curved spine with excessive pinching at the front end. However, sitting on top of the rotation axes permits periodic loading and unloading of the discs in all directions.

Another possible embodiment is using a circular seat shape allowing for omnidirectional use of the seat. The sitter will chose the proper sitting location automatically.

To enhance the effects of the device the seat cushion cannot force the sitter into any preconceived ideal position. It therefore should not assume an ideal pelvis physiology. An assumed general ideal shape of the pelvis will invariantly lead to either insufficient support for one kind and pressure points for another kind of actual pelvis topography. Therefore the design must automatically adapt to user's particular pelvis topography and provide firm support.

The benefits of the device in the embodiment of a chair described herein can be further enhanced through the use of a dynamic backrest. The backrest is designed to provide gentle support for the user's back in the case the user wants to lean back and relax from the activity at hand. While desirable it is not a necessary condition for the proper working of the device.

In one form, the backrest is attached to the dynamically moving top of the device configured as a dynamic support and moves in unison with the seat, creating the feeling of a three dimensional rocking chair. The backrest's position relative to the lateral center of the seat can be translated back and forth to accommodate for different femur lengths and torso sizes.

The shape of the backrest is designed according to ergonomic design guidelines and therefore provides for a height adjustment to custom fit the sitter's back physiology. The backrest is also allowed to pivot in the vertical direction to enable the user to apply pressure to the sitter's lower back by leaning into the backrest and stretching the upper body backward. This movement also opens the chest for better breathing.

In addition to attaching the backrest to the seat top and having it move in unison with the seat, it can be attached to the Gimbal ring permitting forward and backward tilt in unison with the sitter rocking forward and backward, similar to a traditional rocking chair. Attaching the backrest to the stationary bottom support structure of the joint, creates a stationary backrest that the user can lean against in environments where a dynamic backrest would be inappropriate.

BRIEF DESCRIPTION OF THE DRAWINGS

FIG. 12 shows one form of a bearing-like system between the support base and the seating portion;

FIG. 13 shows one form of a friction pad which can be utilized in an embodiment;

FIG. 14 shows a side sectional view along the longitudinal axis where the base pivot attachment members are shown cross-sectionally attached to the pivot bar, and the distal seat pivot attachment member is shown pivotally attached to the seat where the toroidal-shaped dampening system is shown in a sectional view in the lower left and right portions;

FIG. 15 shows the seating portion pivoting about the seat pivot attachment members in the rearward direction;

FIG. 16 is taken about line 16-16 in FIG. 14 and shows one form of one embodiment along the longitudinal axis, where the seat pivot attachment members as shown cross-sectionally attached to the pivot bar and the forwardly located base pivot attachment member is shown attached to the base support;

FIG. 17 shows a tilt about the longitudinal axis where an individual would, for example, be tilting to the right and the seat is pivoting about the base attachment members;

DESCRIPTION OF THE PREFERRED EMBODIMENTS

Figure 1:
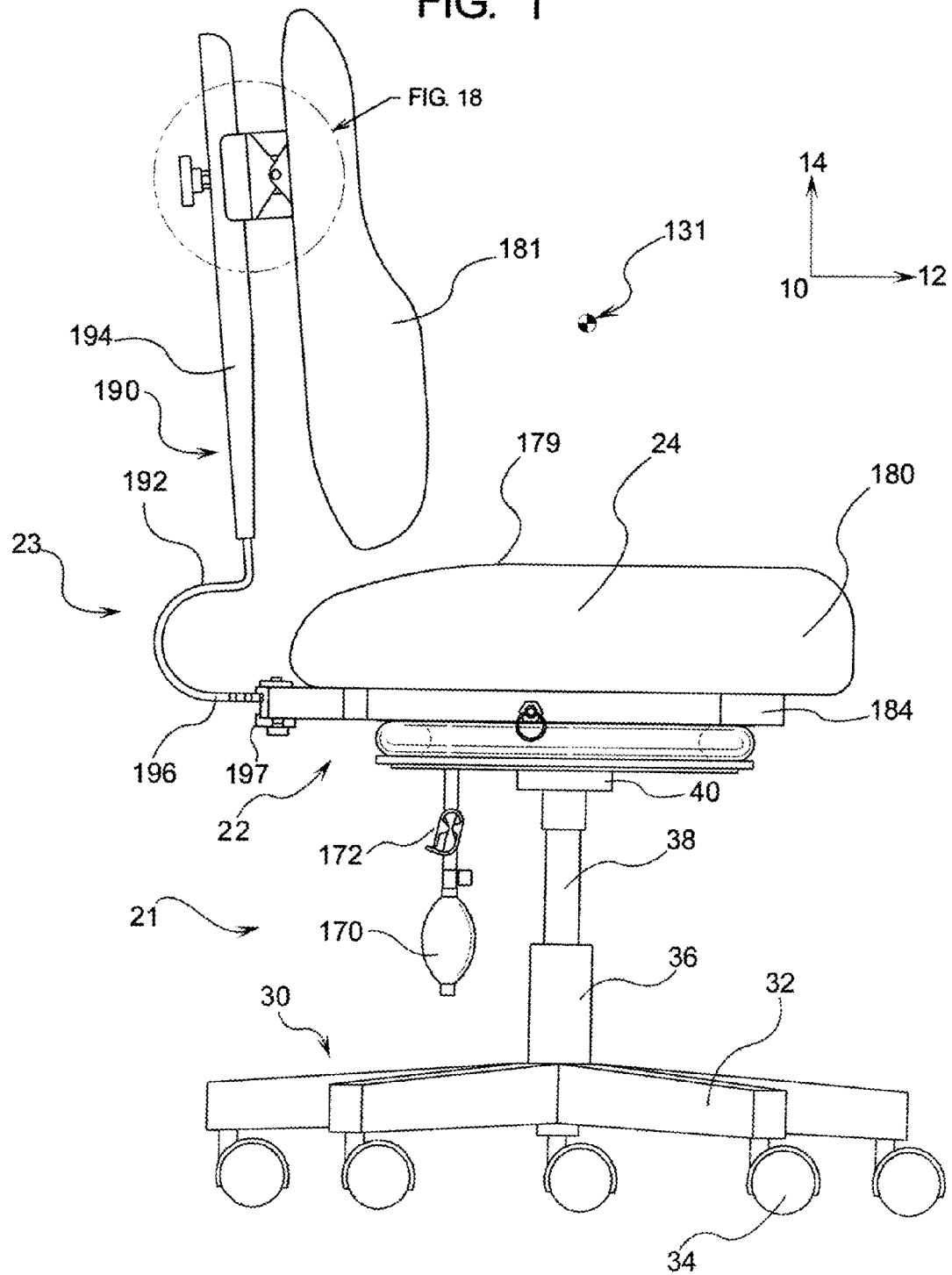
FIG. 1 shows a side view of a seating assembly.

By way of background, the inventor has made the discovery of providing a seating device which allows a certain amount of omnidirectional tilt out of a leveled plane of the seating support the seat will follow the sitter's movement and allow the sitter's body to automatically assume a posture that is nicely erect, even for individuals that are afflicted with neuromuscular impairments like cerebral palsy induced neuromuscular scoliosis. Neuromuscular scoliosis is a sensory motor integration dysfunction, which falls into the category of sensory input and sensory motor processing disorders like ADHD, ADD, autism, Parkinson's and multiple sclerosis. By having the seat flow in a direction which the body naturally does not have to fight a seating environment that attempts to force him/her into an assumed ideal position disregarding the sitter's own particular needs and tends to bias towards by way of the alignment of the individual's hips, the body tends to relax and have a sense of security, since the seat allowed it to assume a posture that uses the least amount of energy to stay balanced. In order for the user to feel safe it is also required that the user does not have the feeling that the seat will flip and the user would lose control. It is important that there is an increasing resistance to the tilt the further the seat is tilted out of the leveled position and therefore leaves the sitter with the perception that the seat will prevent the user from losing control of his/her balance.

Under this condition the biodynamic feedback of allowing the seating support to adjust in a certain direction with a certain amount of resistance allows for relaxation of the various muscles to allow the body to self-adjust to proper alignment. It should be noted that the inventor has a son having cerebral palsy, and was afflicted with a severe curvature of his spine because of scoliosis. He was looking to implement the benefits associated with therapeutic Horseback riding into the seat of his son's wheelchair and provide his son with the observed benefits on a continual basis. After attempting various seating arrangements, he has arrived at the seating device which is subject to the claims of this application. Present analysis indicates that the result of a device similar to that as described herein (and more broadly claimed in the claims recited below) has eliminated the need for the previously impending spine fusion surgery to keep the boy's torso from collapsing and dramatically improved and increased the sense of balance and also the agility of the inventor's son.

In the case of scoliosis induced body asymmetries present analysis indicates that allowing the hip region to align in the direction which may initially seem to cause further dis-alignment of the spine allow the muscles that are too tense causing the spine to become concave on the side where the muscles receive the proper triggering from the efferent nerve signals to relax and reduce the amount of concavity and allow the muscles on the convex side of the spine to assume some part of the balancing act to allow greater degree of spinal alignment. The proper stimulation of the core (deep layer) muscles along the spine through a safe and dynamic sitting platform is key for the proper activation of the mid layer muscles connecting the spine to the hips, femurs and abdominal muscles for healthy posture. A static sitting platform does not encourage that stimulation. It is believed by the inventor that actual, extensive use of an item which is subject to the claims herein below has eliminated the need for spine fusion surgery to eliminate collapse of the torso for his son. Therefore, it is strongly believed that the apparatus as described herein provides the on first sight counterintuitive and unexpected result of greater spinal alignment. As indicated above and described in detail below, present analysis indicates that allowing the lower portion of the spine, in particular the hips and lumbar region, to tilt in a direction in which they are predisposed by way of the uncontrolled muscular contractions such as that from cerebral palsy, appears to allow for relaxation of the tense muscles which brings about alignment, or at least better alignment of the spinal column.

Figure 8:
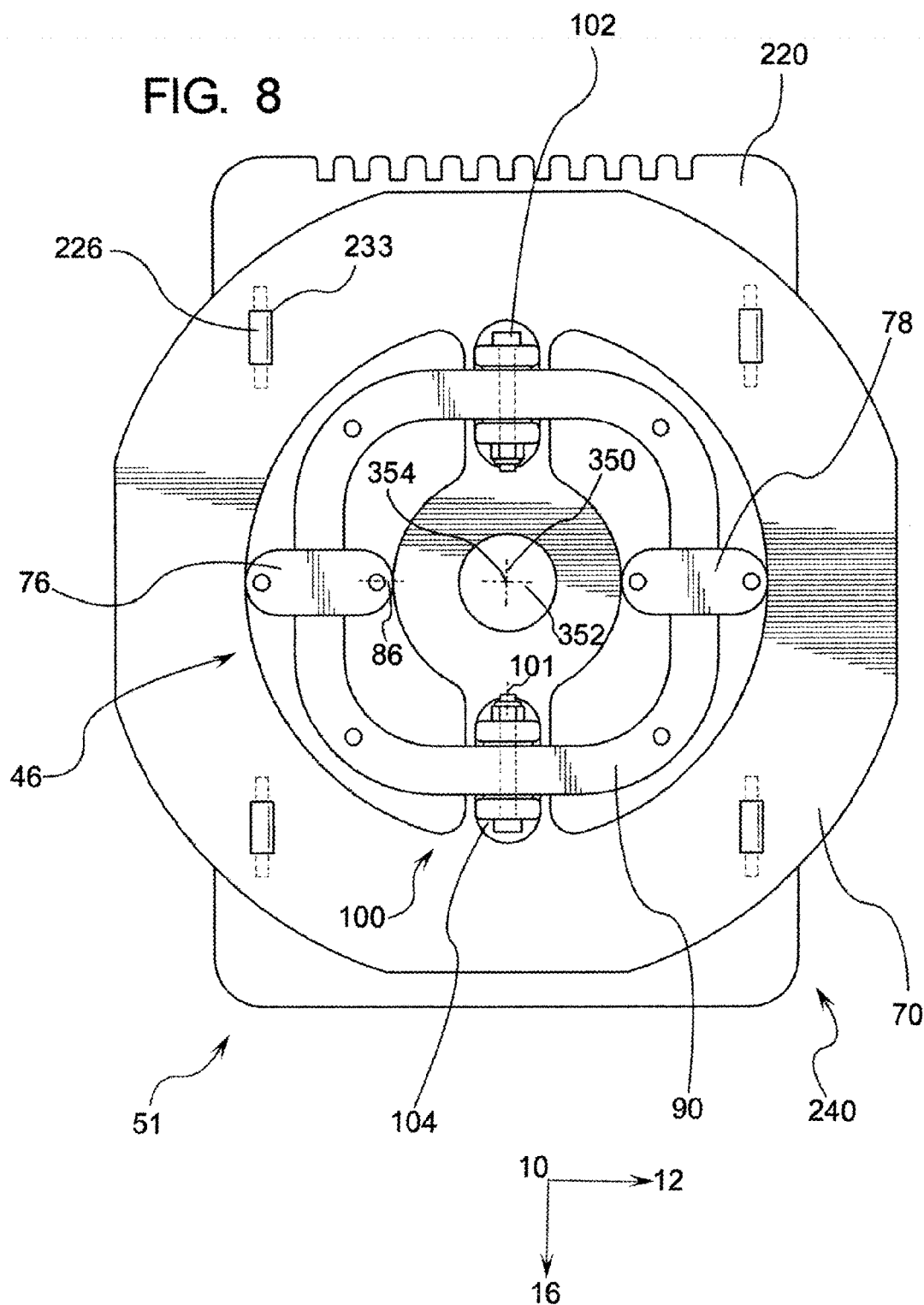
FIG. 8 shows the main assembly as adapted to be attached to the base structure and movably attached to the seating portion.

As shown in FIG. 1, the dynamic motion assembly which in one form is a seating assembly 20 comprises a support structure 21, a motion control assembly 22, and a seating portion 24. To aid in the description, an axes system 10 is defined where the axis 12 indicates a longitudinal direction and points in a forward direction as shown in FIG. 1 and the axis 14 indicates a vertical axis pointed in a vertical direction. As shown in FIG. 8, the lateral direction is indicated at 16.

As shown in FIG. 1, the support structure 21 in one form comprises the lower support 30. In one form, the lower support is of a standard nature where a plurality of radially extending arms 32 have wheel supports 34. However several other standard configurations can be envisioned by anyone who is skilled in the art. The lower support 30 in form has the vertical extension 36 which telescopically extends the base post 38. In general, the support structure can be of a variety of forms. Oftentimes it is somewhat advantageous to have the base post 38 be an adjustable type member to raise the upper assembly 23.

In general, the seating portion 24 and the motion control assembly 22 comprise the upper assembly 23 as shown in FIG. 1. There will first be a discussion of the motion control assembly 22 with initial reference to FIG. 14. In general, the attachment portion 40 is, in one form, attached to the base post 38. Of course a variety of types of attachments can be made.

Figure 2:
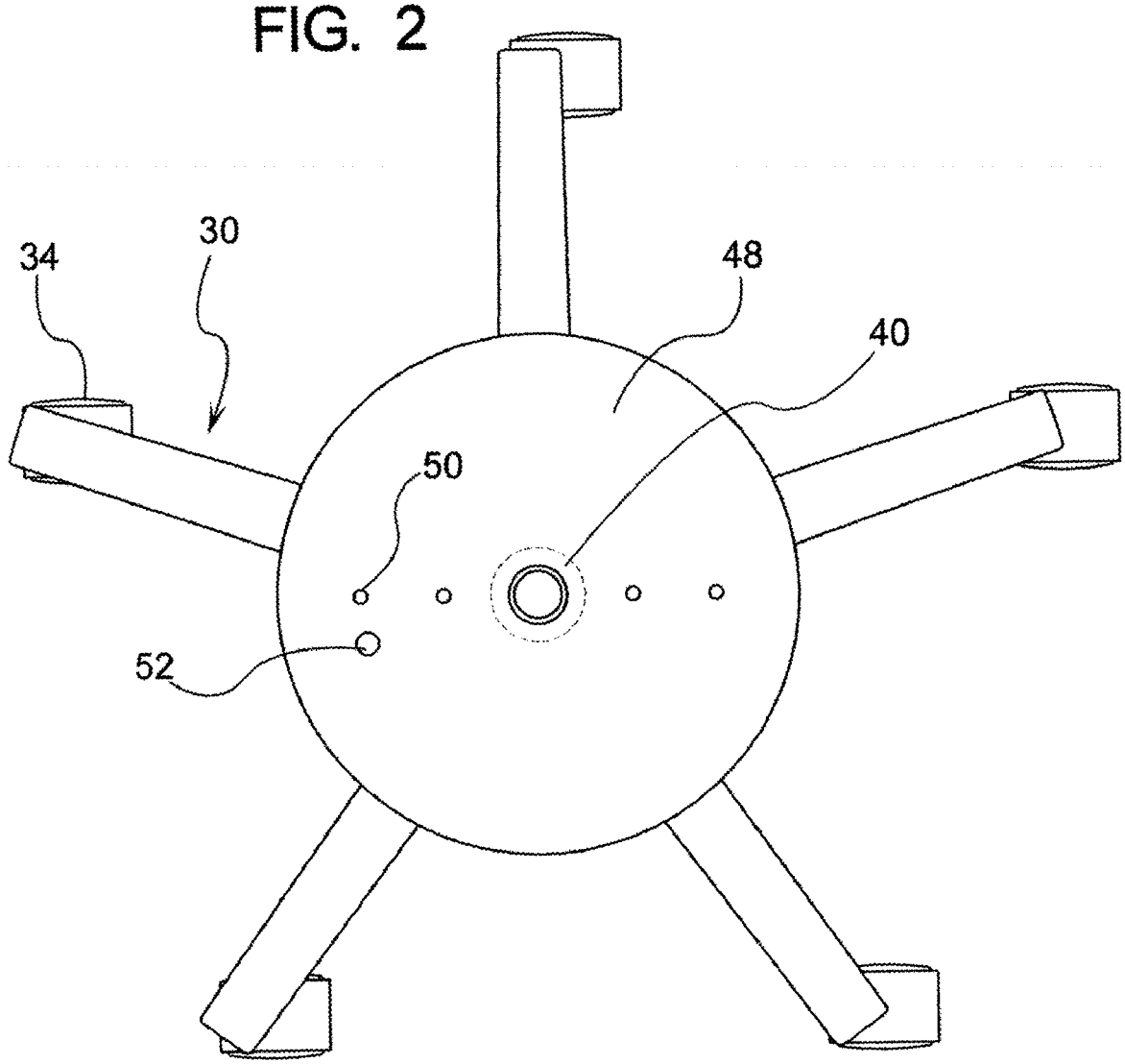
FIG. 2 shows a top view of the lower support and the base support.

As shown in FIG. 14, in general, the motion control assembly 22 comprises upper and lower attachment assemblies 44 and 46. In general, the lower attachment assembly 46 comprises a base support 48 which, as shown in FIG. 2, in one form comprises a disc, but is not limited to this shape as other configurations can be envisioned by those skilled in the art, having openings 50 for attachment purposes as well as a pass-through opening 52. In general, the disclosure below describes a motion control assembly which in one form is a joint-like system which in certain engineering disciplines is referred to as a Gimbal joint. The lower support structure 21 can be of a variety of designs which in many forms has a lower support 30 which is generally movable (e.g., via the wheel supports 34 in FIG. 1) to allow repositioning of the chair. In other forms the lower support could be more static and positioned in a more fixed manner. In a Gimbal joint-like attachment, a pivot bar 90 is pivotally attached in some form to the lower attachment assembly 46 and a seat pivot attachment assembly 100 is further pivotally attached to the pivot bar 90. The base pivot attachment assembly 74 defines a base pivot axis 86 and the seat pivot attachment (which is attached to the movable frame of reference, the pivot bar 90) defines a seat pivot axis 101. The base pivot and the seat pivot axes in one form are perpendicular and intersect one another. The seat pivot attachment assembly 100 is connected to the seating portion 24; therefore, when a user sits on the seating portion 24, they are allowed to rotate about a longitudinal and lateral axis. As shown in FIGS. 14 and 16, the pivot-like motion of the seat about the various axes allows for a plurality of rotational movements about the intersect points between the base and seat pivot axes 86 and 101.

With the foregoing general background in place, there will now be a more detailed discussion of the motion control assembly 22. Of course, it should be noted that the various components and sub-components are shown by way of illustration, and the broad teachings of the disclosure of course can be carried out in a plethora of ways to accomplish the general concept encompassed within the specific details recited below.

The lower attachment assembly 46 comprises the upper dampening system support 70 and a lower dampening system support 72 as shown in FIG. 14. The base pivot attachment assembly 74 in one form comprises first and second base pivot attachments 76 and 78 which are attached to the lower dampening system support 72 by way of the fasteners 80 and 82 such as that shown in FIG. 14. The first and second base pivot attachments 76 and 78 in one form can be a common type of pivot attachment which allows for rotation about a base pivot axis 86. Therefore, in a preferred form, the center of rotation of the first and second base pivot attachments 76 and 78 has a common axis of rotation that is substantially co-linear to provide fairly resistance-free and unobstructed rotation of the seating portion 24 and, more particularly, rotation of the pivot bar 90.

The first and second base pivot attachments 76 and 78 are pivotally attached to the pivot bar 90. As shown in the bottom view in FIG. 10, the pivot bar 90 is adapted to rotate about the base pivot axis 86. As further shown in FIG. 10, the seat pivot attachment assembly 100 is in one form comprised of first and second seat pivot attachment members 102 and 104. The seat pivot attachment members 102 and 104 are pivotally attached to the longitudinal regions connecting the rearward and forward lateral regions 94 and 96 of the pivot bar 90. The seat pivot attachment assembly 100 has a seat pivot axis 101 which in a preferred form is orthogonal to the base pivot axis 86 where the seat pivot axis 101 further intersects the base pivot axis 86 at an intersect point 120.

It should be noted that given various tolerances and certain other design situations, the axes 86 and 101 need not be perfectly orthogonal or intersect, etc. However, in one preferred form, such orientation is utilized.

Of course, the base pivot axis 86 and the seat pivot axis 101 need not be along the longitudinal and lateral axes. In fact, due to the nature of the gimbal joint action, it can be reoriented at any rotational offset, perhaps even 45° with respect to the longitudinal and lateral axes, since the combination of rotations about these axes allows for a plurality of rotations about the intersect point 120 such as that shown in FIG. 10.

FIG. 16 shows a view taken along line 16-16 of FIG. 14. As shown in this figure, the attachment assembly 46 in part comprises the first and second seat pivot attachment members 102 and 104 which in one form are attached by way of fasteners 110 and 112. These fasteners extend through the upper dampening system support 70 as well as the support base 220. Of course, it should be noted that the various attachment assemblies can be utilized.

Figure 10:
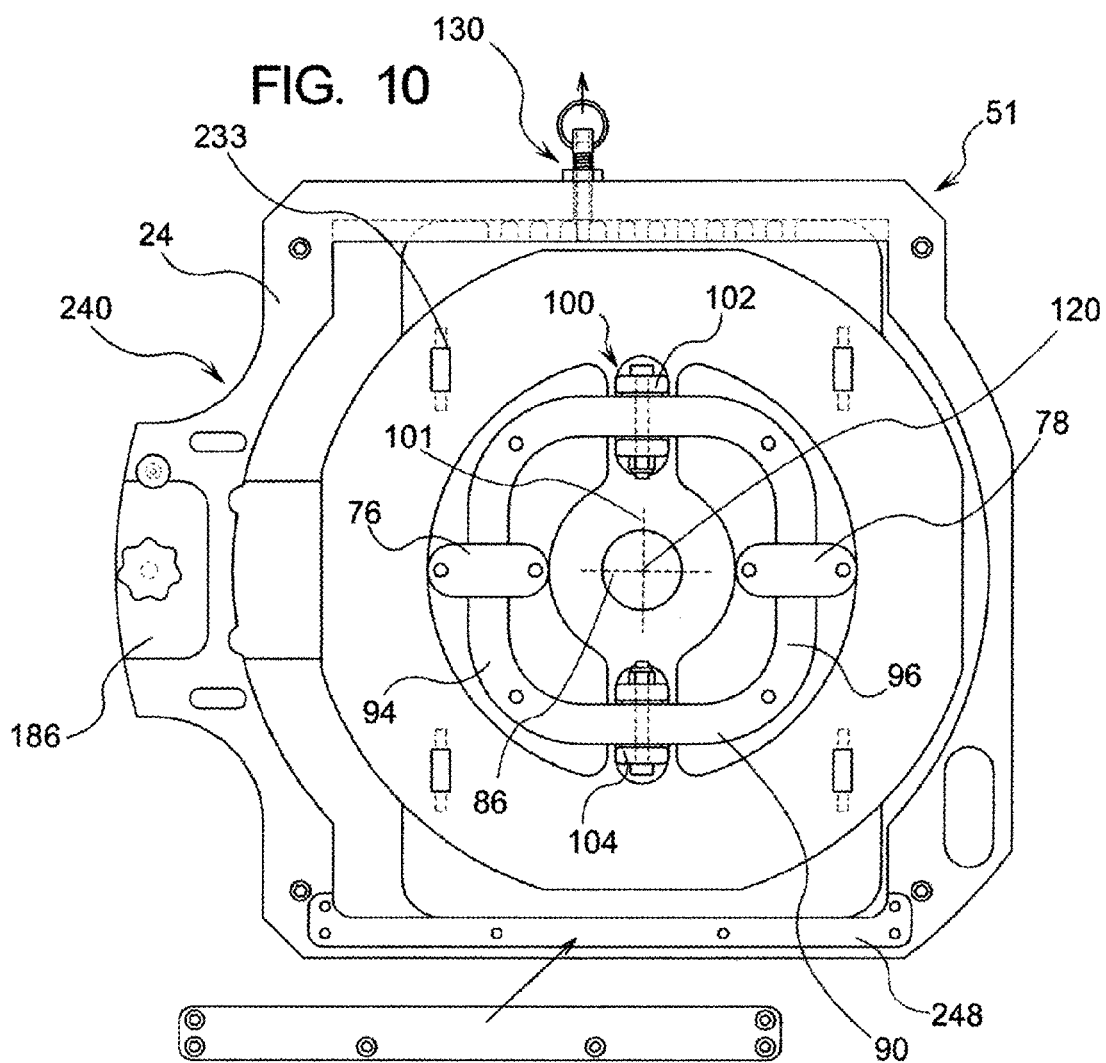
FIG. 10 shows the main assembly being movably attached within the seat and held in place by the longitudinal adjustment system.
Figure 11:
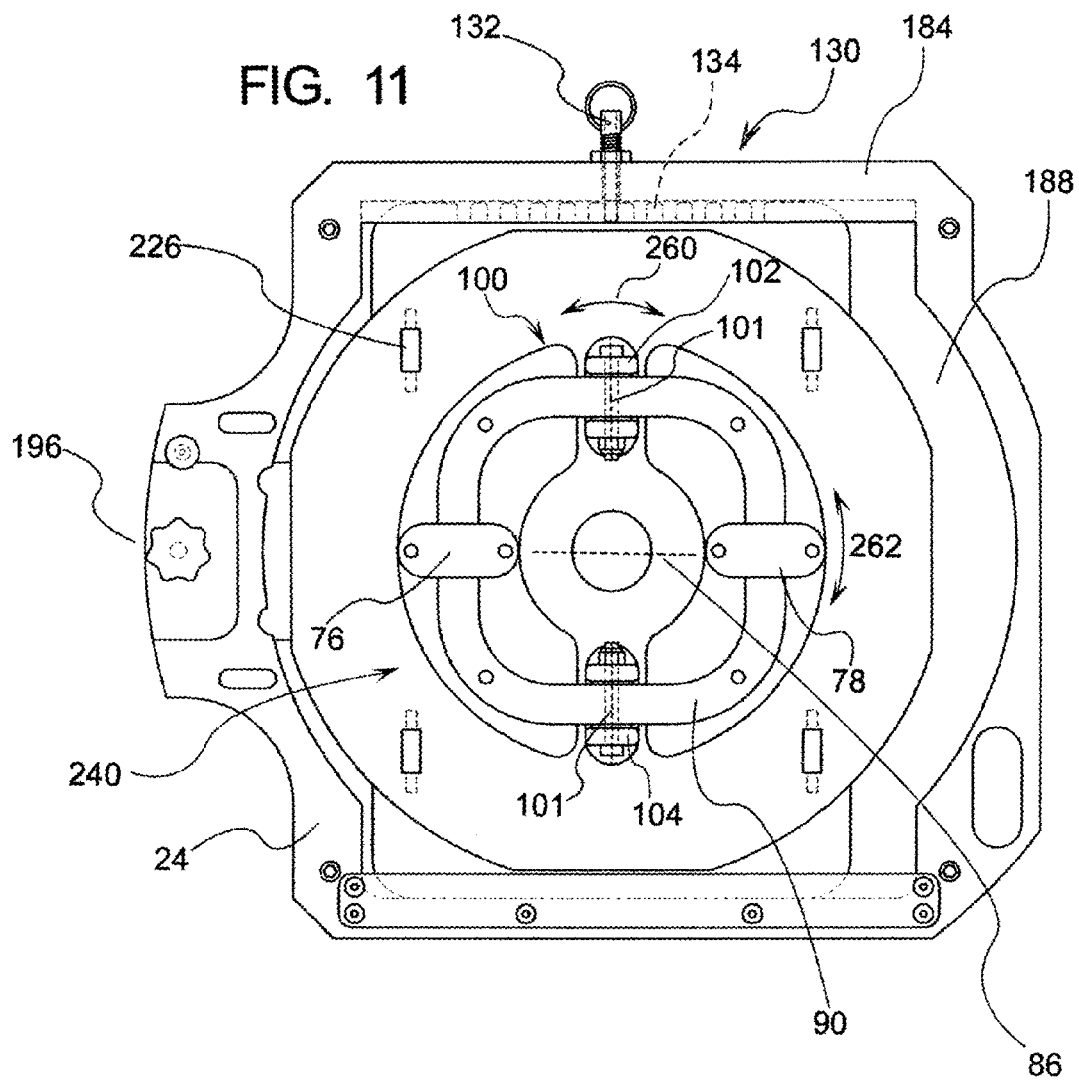
FIG. 11 shows the main assembly attached in the lower portion of the seating portion.

Now referring back to FIGS. 10 and 11, as shown in these figures, a main assembly 51 is adapted to reposition with respect to the seating portion 24. Or, rather, the seating portion 24 repositions with respect to the main assembly 51. In general, as shown in FIGS. 10 and 11, the intersect point 120 is the intersection of the base pivot axis 86 and the seat pivot axis 101. Of course, as noted above, there may not be a perfect intersection between these axes. However, in one form, the axes 86 and 101 are close to intersecting as per acceptable manufacturing tolerances.

Now referring back to FIG. 1, it can be appreciated how an individual sitting upon the seating portion 24 may have a center of gravity positioned at 131. Therefore, as described further below with reference to FIGS. 20-23, it is advantageous to reposition the seating portion 24 with respect to the main assembly 51 to adjust the intersect point 120 (see FIG. 10) with respect to the seating orientation of the individual seated upon the seating assembly 20. As shown in FIG. 11, the longitudinal adjustment system 130 in one form is comprised of a retractable pin 132 that is positioned in the lateral region of the seat support 184, and an extension portion is adapted to engage one of a plurality of receiving slots 134 for adjustment of the seating portion with respect to the main assembly 51. Of course, a number of adjustment-like mechanisms can be utilized other than a pin 132 to comprise a longitudinal adjustment system 130.

With the foregoing description in mind, there will now be a discussion of the assembly of the components in one form. Of course, it must be reiterated that the broad teachings of the invention as claimed broadly below claim a plurality of components and sub-components, where each of the terms used and described broadly herein could be unitary structures or comprised of more than one component. At any rate, one form of carrying out the disclosure is now described.

Figure 3:
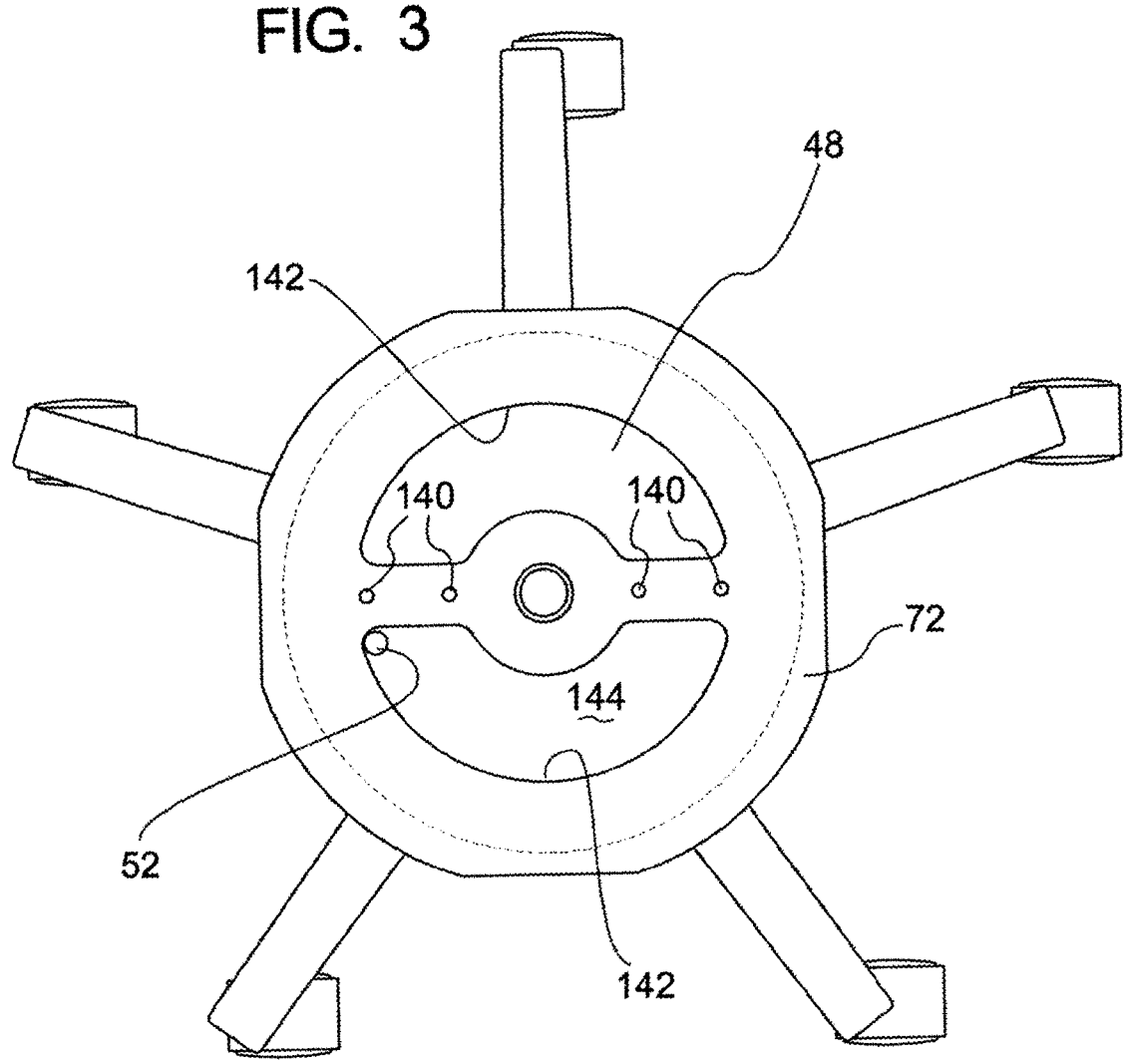
FIG. 3 shows one form of a seat assembly where a lower dampening system support is placed upon the base support.

As shown in FIG. 2, the base support 48 is attached to the attachment portion 40. As shown in FIG. 3, the lower dampening system support 72 is placed over the base support 48. In one form, the openings generally indicated at 140 correspond in location to the openings 50 of the base plate shown in FIG. 2. Further, the lower dampening system support 72 in one form is substantially cylindrically shaped where a surface defines the open regions 144, which in one form provide clearance for the portions of the pivot bar 90, and the pivot attachments members 102 and 104 described in more detail herein. The pass-through port 52 can allow for an inflation tube 164 or other type of adjustment mechanism to adjust the amount of resistance of the dampening system 160. As shown in FIG. 14, the dampening system 160 in one form is comprised of a tubular member 162 which is toroidal shaped and can be, for example, an inner tube. Of course, a number of types of the apparatus could be utilized, such as a plurality of springs positioned circumferentially around (or a similar structure to) the upper and lower dampening system supports 70 and 72.

Figure 4:
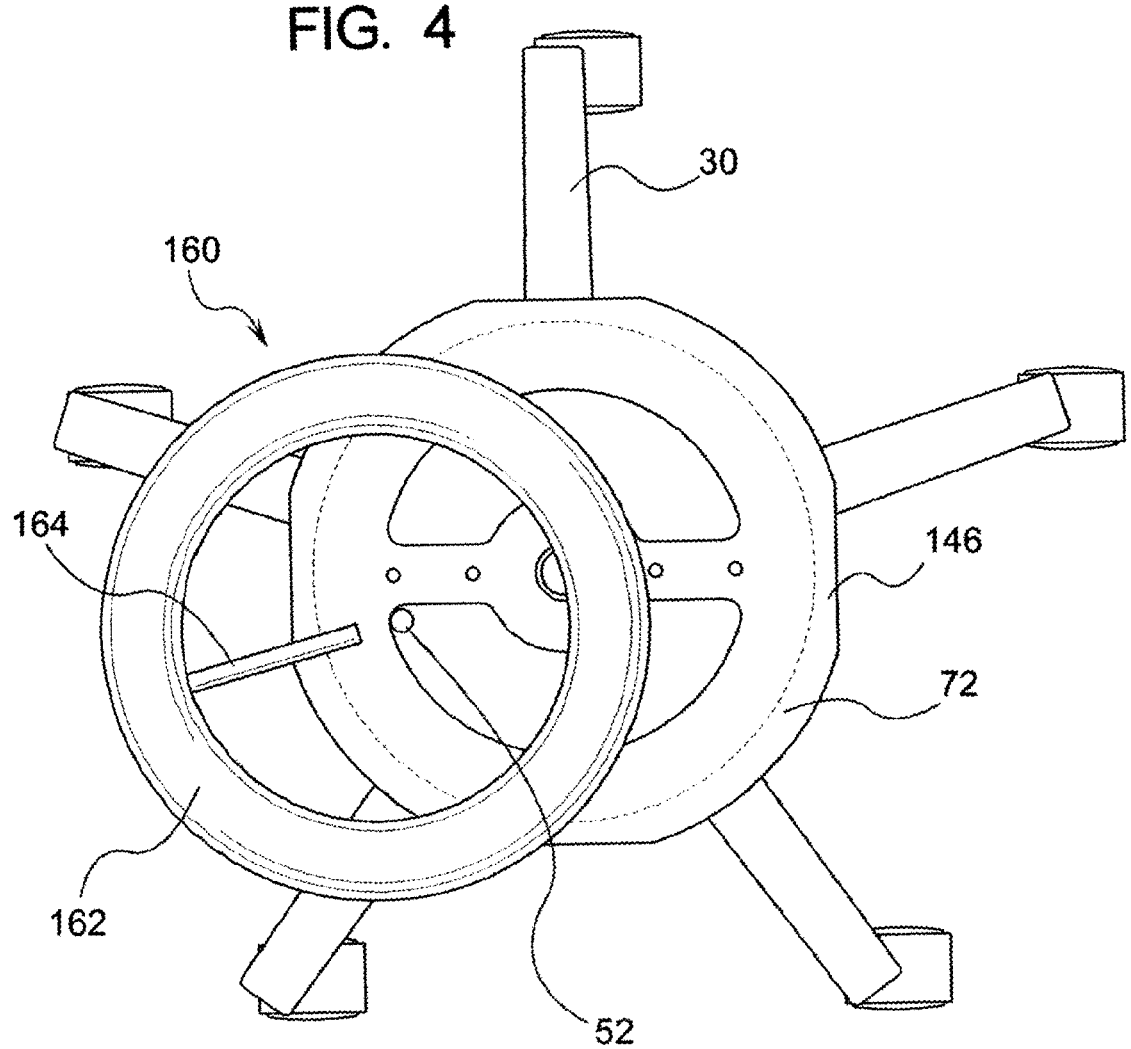
FIG. 4 shows the dampening system being positioned in place over the base support.
Figure 5:
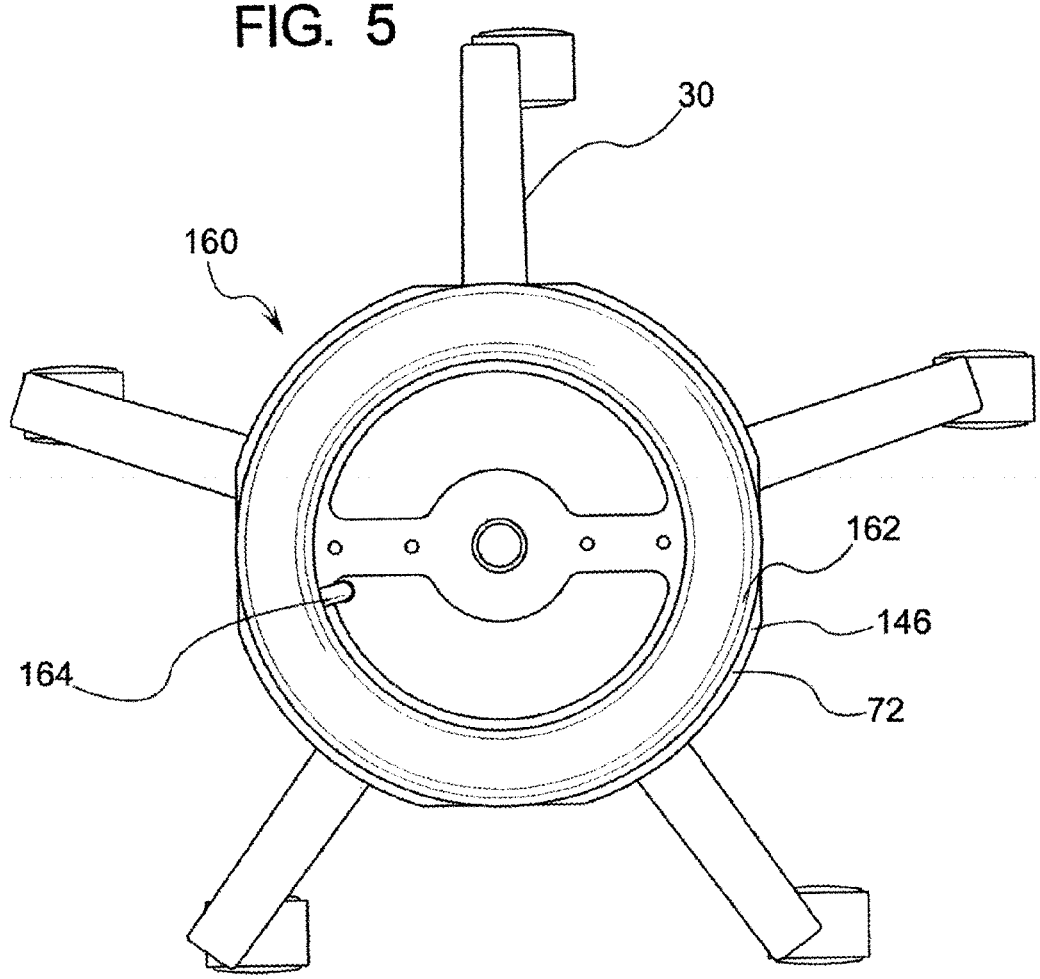
FIG. 5 shows the dampening system which in one form comprises an inflatable tube.

As shown in FIG. 4, a dampening system 160 is shown placed upon the upper surface 146 of the lower dampening system support 72. Therefore, as shown in FIG. 5, the dampening system 160 which in one form is the tubular member 162 is positioned on the surface 146 and adapted to supply a force thereto around the circumferential regions thereof. As shown further in FIG. 5, the inflation tube 164 extends through the pass-through port 52. The inflation tube 164 can be supplied with a pump-like member 170 having an optional clamp 172 for adjustment of the pressure or rather volume within the tubular member 162 (see FIG. 1). Of course, the inflation tube 164 can be of a variety of mechanisms to adjust the amount of rotational resistance about the base pivot axis 86 and the seat pivot axis 101. For example, various other mechanisms such as springs adjusting the distance therebetween can affect the amount of preload between the upper and lower dampening system supports 70 and 72 (see FIG. 14). Further, a plurality of separate type chambers could be utilized to function as the dampening system 160. For example, a plurality of discrete chambers can possibly provide variable resistance in different directions circumferentially around the unit. In such a situation, for example, a longitudinally rearward section has more pressure therein, providing more resistance about the lateral axis when the individual leans rearward.

Figure 17A:
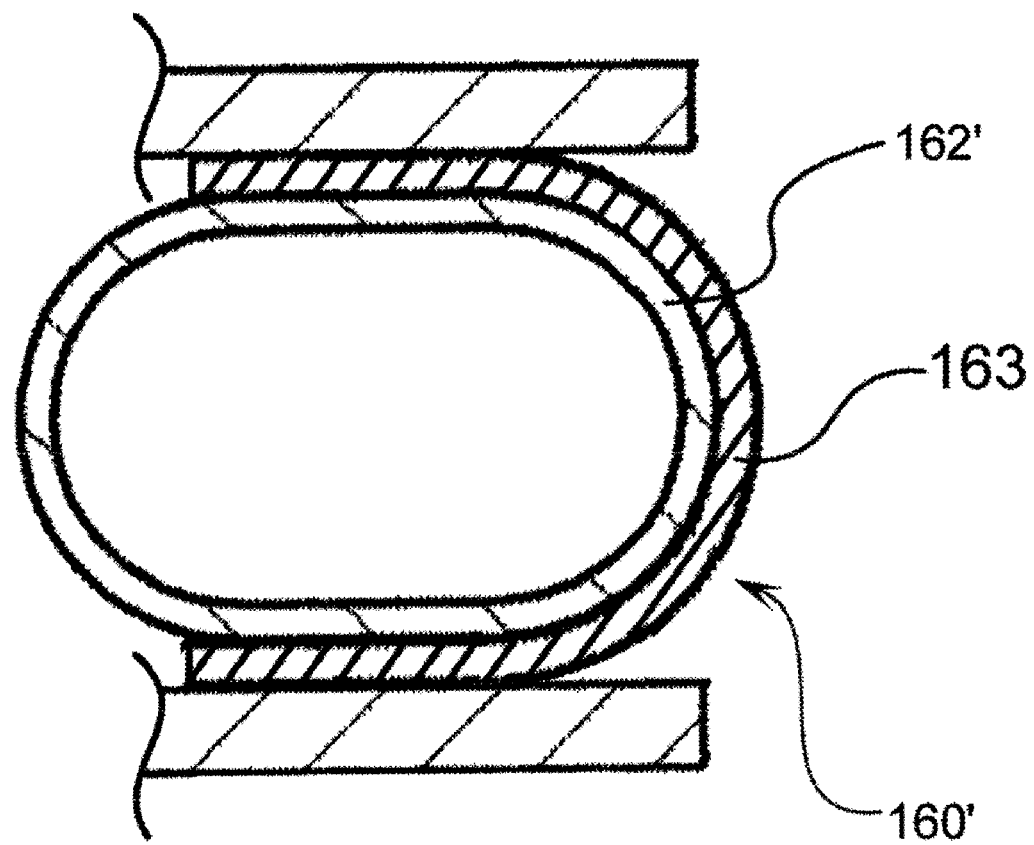
FIG. 17A shows an alternative dampening system.

As shown in FIG. 17A, there is shown an alternative dampening system 160'. In this form, the inner tube-like member 162', which is a tubular-like toroidal member, is encompassed with a partially rigid flexing member 163 which is partially toroidal and can be constructed in a similar manner as a bicycle tire or the like. The flexing member 163 can provide a certain amount of fixed rotational resistance in the event that the tubular member 162' is overly deflated. Further, the flex member 163 provides a certain amount of fixed resistance in the dampening system.

Figure 6:
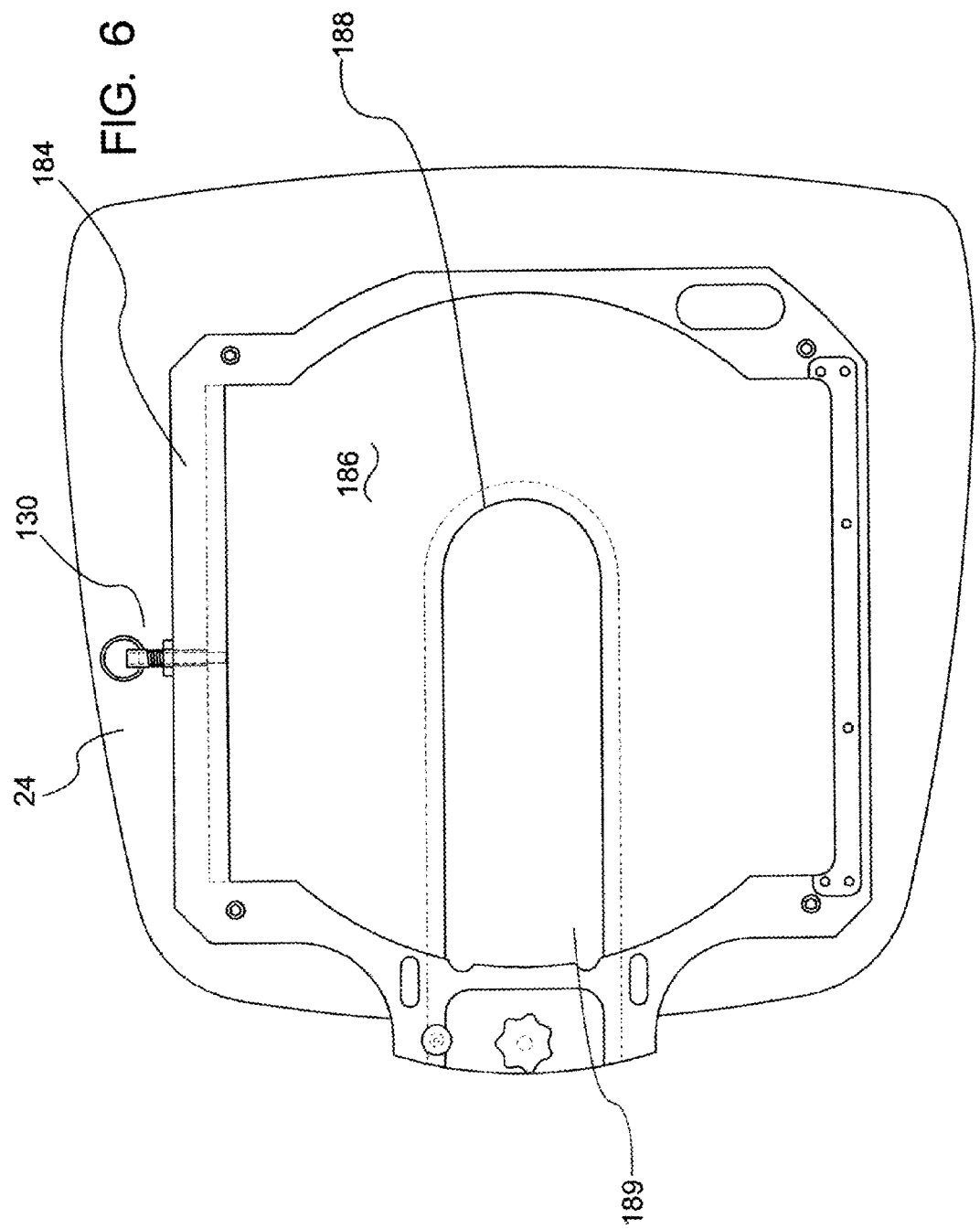
FIG. 6 shows a view under the seating portion.

Returning the discussion back to FIG. 5, the tubular member 162 is placed upon the lower dampening system support 72. Reference is now made to FIG. 6, where there is shown a bottom view of the seating portion 24. In general, as described above, the longitudinal adjustment system 130 in one form is attached to the seating portion 24. Referring back to FIG. 1, in general, the seating portion 24 comprises a lower seat 180 which in one form is a seat cushion made of a padded material. Padding has the advantage of providing a slight deacceleration when someone sits thereon, and further by slight deformation of the padding, allows for a more contoured fit to the generally non-planar surface of the bottom region of an individual. In general, the seating portion 24 comprises the base region 179 and the longitudinally rearward region 181. As previously mentioned, the base region 179 generally comprises the lower seat 180. Attached to the lower portion of the lower seat or formed therein is the seat support 184.

Now referring back to FIG. 6, the seat support 184 has a lower surface 186 defining a slotted region 188. The seat support 184 further, in one form, comprises a backrest receiving slot 189 adapted to receive a backrest support structure 190.

Figure 7:
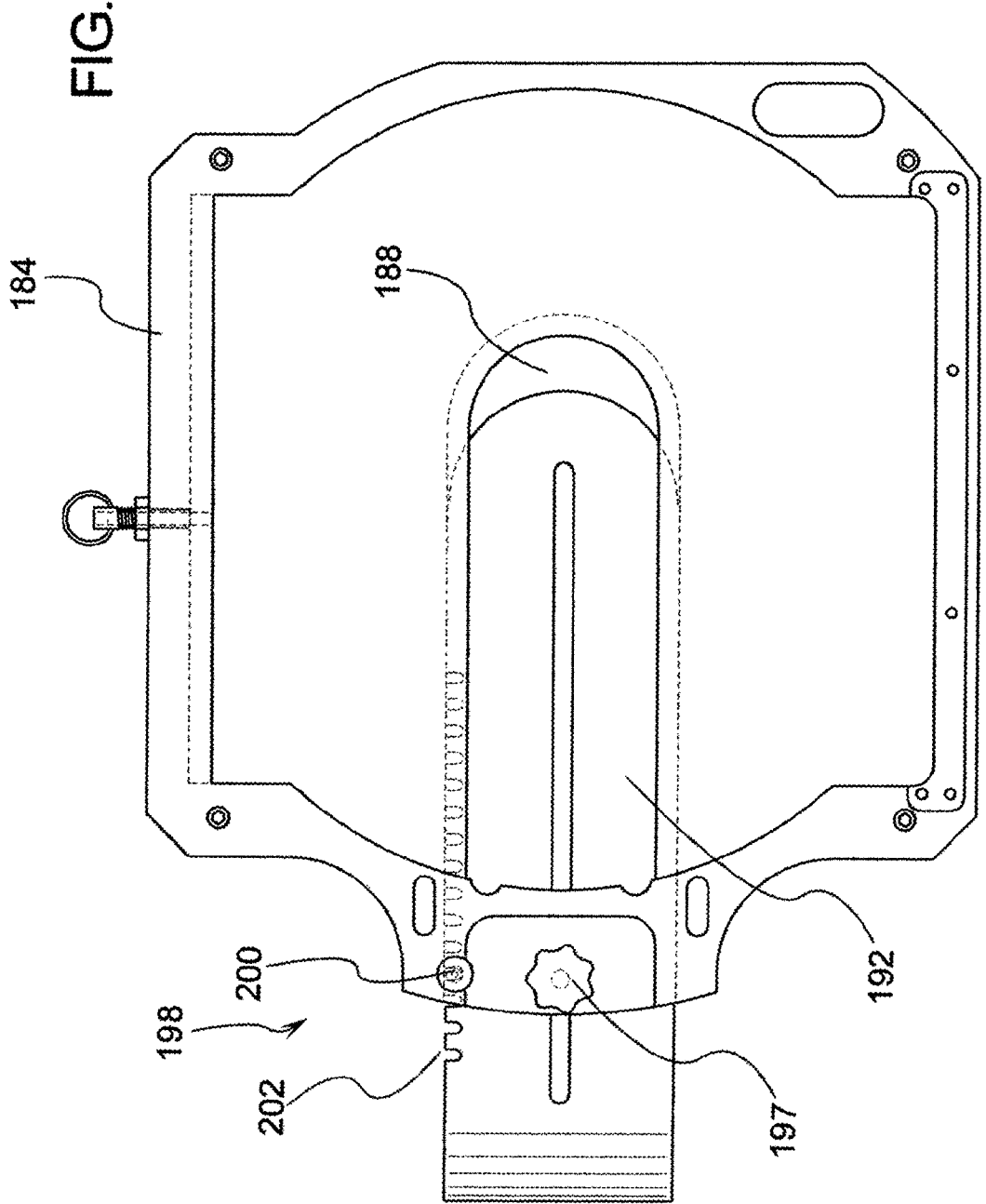
FIG. 7 shows another view under the seating portion where the seat attachment is attached to a slot region of the seating portion.

As shown in FIG. 1, in the longitudinal rearward region 181, there is a backrest support structure 190 having a lower region 192 and an upper region 194. The lower region 192, in one form, has a longitudinally extending member 196 which is adapted to extend within the backrest receiving slot 189 as shown in FIG. 7. A tension adjustment system 197 can be utilized as well as a longitudinal depth adjustment system 198. In one form, a retractable pin-like member 200 can be utilized, which is adapted to engage a surface defining a plurality of slots or openings 202 positioning the backrest in a plurality of longitudinal positions with respect to the seat support 184. Referring back to FIG. 1, the upper portion 194 of the backrest support structure 190 in one form is a conventional type of an attachment, or a particular type of attachment description in FIG. 18.

Figure 9:
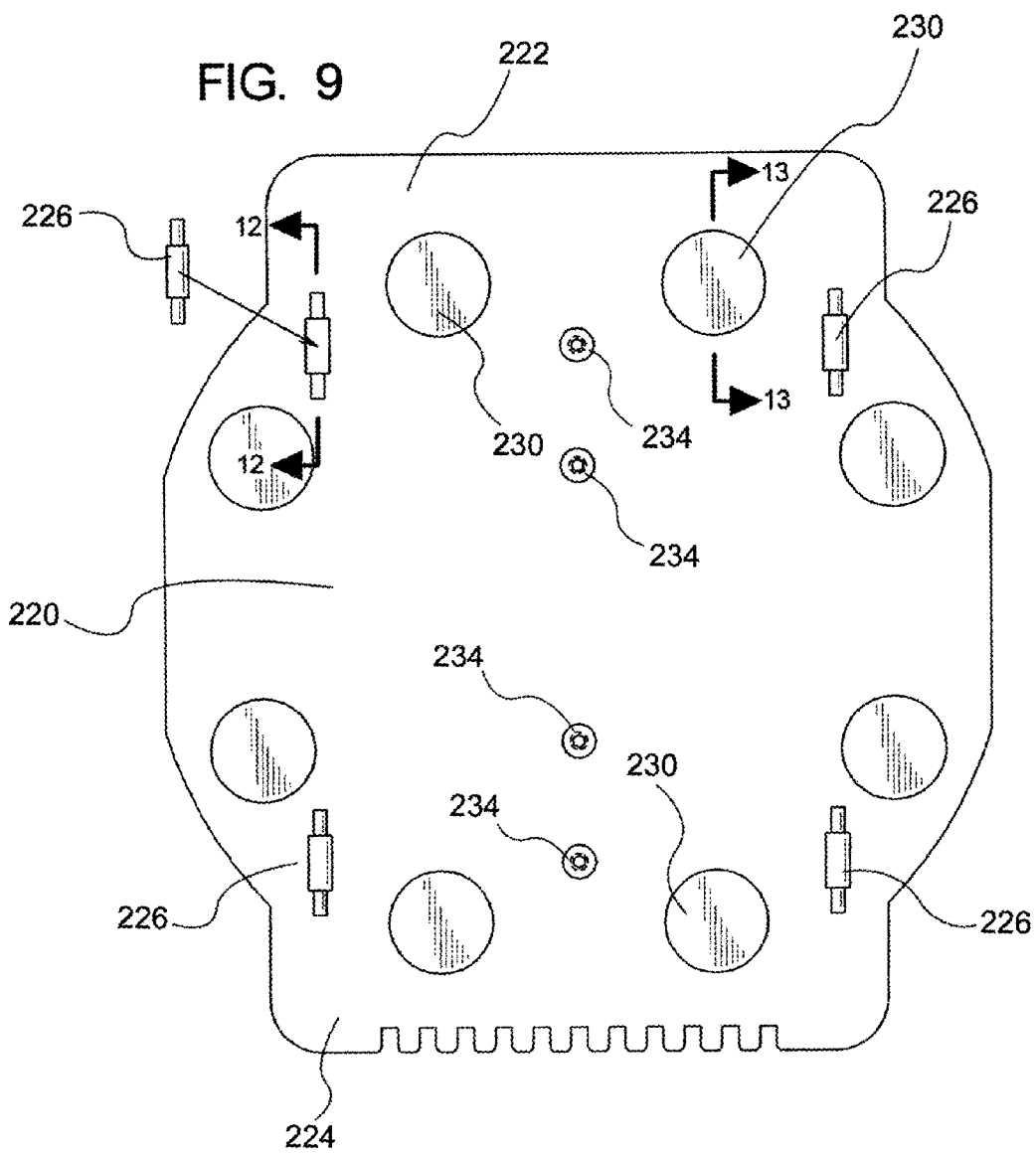
FIG. 9 shows a top view looking down upon the support base.

There will now be a general discussion of the lower and upper support structure regions. Referring to FIG. 8, the upper dampening system support 70 is positioned adjacent to the support base 220. Therefore, the first and second seat pivot attachment members 102 and 104 are rigidly attached to the support base 220. As shown in FIG. 9, there is a top view of the support base 220 where located near the perimeter lateral portions 222 and 224 are bearing assemblies 225, which comprise a plurality of bearing members 226. Further, friction pads 230 can be utilized to reduce the amount of friction that may engage between the support base 220 and the seat support lower surface 186 as shown in FIG. 6. The attachment members such as the bolts 234 are rigidly attached to the seat pivot attachment members 102 and 104 as shown in FIG. 8, and the upper dampening system support 70 is interposed in between. As shown in FIG. 12, the bearing members 226 extend partially within a slotted region 233 within the upper dampening system support 70. In other words, the bearings 226 do not extend within the plane defined by the surface 232 of the support 70, but are contained therein.

Now referring to FIG. 11, the upper mobility assembly 240 is positioned within the slot region 188 of the seat support 184. As described above, the seating portion 24 is repositionable with respect to the upper mobility assembly 240, and more particularly, the main assembly 51 as shown in FIG. 1.

FIG. 11 is a lower view of the seat with the upper mobility assembly 240 attached thereto. To reiterate, the upper mobility assembly 240 is comprised of the motion control assembly 22 as shown in FIG. 14 without the lower dampening system support 72 and the structure contained below. However, referring back to FIG. 11, it should be noted that the pivot bar 90 is adapted to rotate about the seat pivot axis 101 as indicated by the arrow 260, and the first and second base pivot attachments 76 and 78 are pivotally attached to the pivot bar 90 and are each (in one form as shown in FIG. 11 independently) adapted to rotate with respect to the pivot bar 90 in the motion indicated by arrow 262.

Now referring to FIG. 14, there is shown the seating assembly 20 in a neutral position. The base pivot attachments 76 and 78 are attached to the lower dampening system support 72, and the seat pivot attachment member 102 as shown is pivotally attached to the pivot bar 90 and rigidly attached to the seating portion 24. Now referring to FIG. 15, there is shown the operation of the attachment assembly 46. In this form, presumably the center of gravity of the individual sitting upon the seating portion 24 is shifted rearwardly. At any rate, the seating portion 24 pivots about the seat pivot axis 101. Now referring to FIG. 16, taken at line 16-16 in FIG. 14, there is shown a view taken along a lateral cut of the device showing both of the seat pivot attachment member 102 and 104 which are pivotally attached to the movable pivot bar 90. Referring to FIG. 17, there is shown a situation where the individual sitting upon the seat shifts their center of gravity to the right where the pivot bar 90 rotates about the seat base pivot axis 86 defined in part by the first base pivot attachments 76, and more specifically the center rotation of this component. Of course, it should be noted that the base pivot attachment assembly 74 and the seat pivot attachment assembly 100 operate independently of one another to allow rotation about each of their respective axes.

As shown in FIG. 12, the bearing member 226 is shown positioned within the support plate 220. The outer surface 227 of the bearing extends slightly beyond the outer surface 221 of the support plate 220. The slot 233 positioned in the upper dampening system support 70 allows for the unobstructed rotation of the bearing 226 such as that shown in FIG. 8. In one form, the bearings are utilized as shown in FIG. 12 where the outer surfaces 227 engages the lower surface 186 of the seat support 184. As shown in FIG. 13, the friction pads 230 can extend slightly beyond the surface 232 to provide additional engagement between the support face 220 and the lower surface of the seat support 184 such as that shown in FIG. 14. It should be noted that with various pressures exerted on the seat support 184 causing possible deflection, the friction pads 230 can assist in distributing the load exerted thereon, particularly when adjusting the seating portion 24 with respect to the lower support structure 21.

Figure 18:
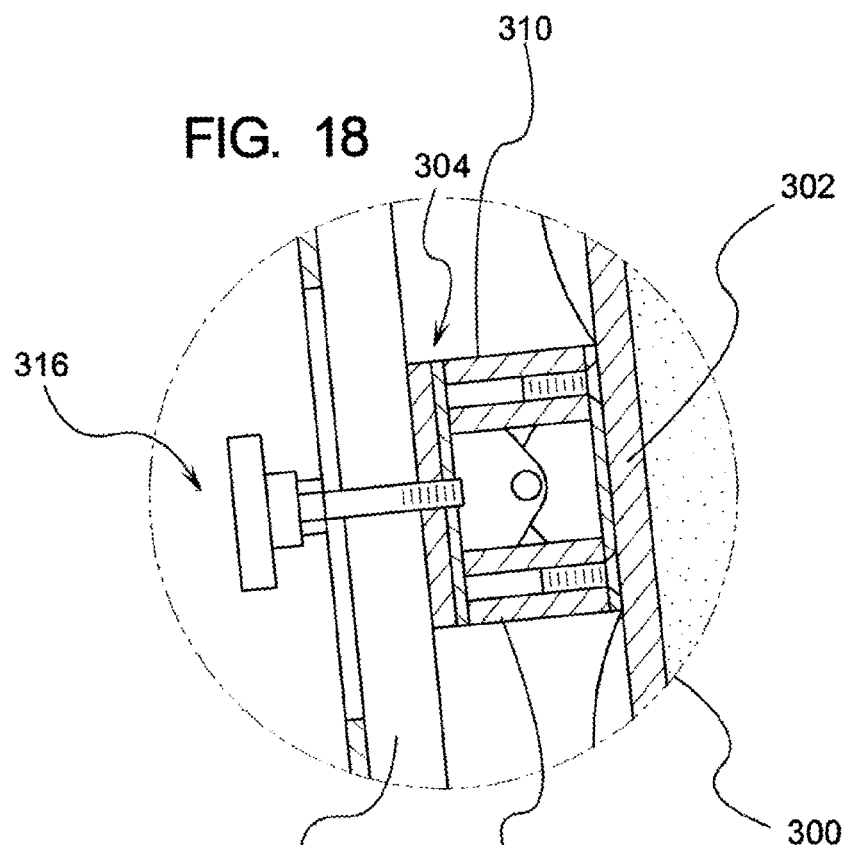
FIG. 18 of is a fragmentary close-up view of one form of the backrest system showing details of the adjustment mechanism.
Figure 19:
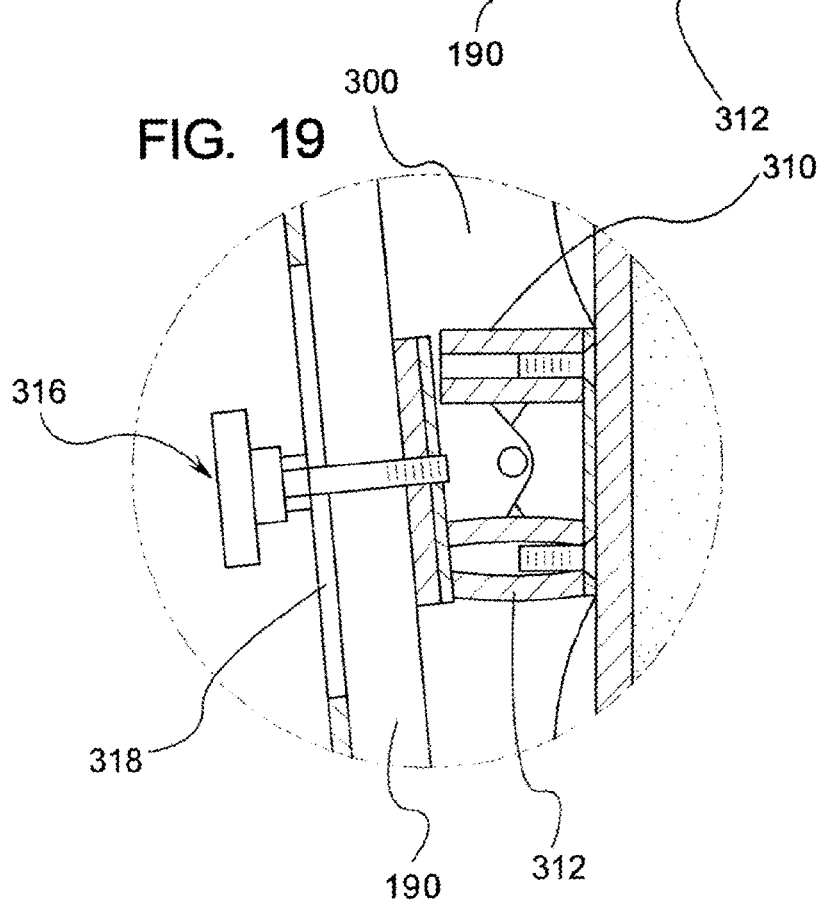
FIG. 19 shows a view of the backrest system where the backrest is tilted about a lateral axis.

As shown in FIG. 18, there is a close-up of the backrest system 300. In general, the backrest system 300 comprises a back plate 302 with a backrest cushion attached thereto. The attachment mechanism 304 connects the back plate 302 to the backrest support structure 190. Of course, any type of conventional system can be utilized. However, in one form, upper and lower deflection members 310 and 312 are utilized, where as shown in FIG. 19, the lower deflection member 312 is in a compressed state where a slight buckling or deflecting-like compression action occurs. Of course, the unit is adjustable by the adjustment mechanism 316, which in one form is a frictional engagement where a screw-like member applies friction or is received by slight indentations of any sort within the slot 318 of the backrest support structure 190. It should be reiterated, of course, that a variety of types of back support systems can be utilized to provide a back support or an adjustable type of support.

Referring to FIG. 8, there is shown a lateral seating reference axis 350 and a longitudinal seating reference axis 352. These axes are useful in defining the relationship between the seating orientation of the individual and the seating unit itself. In one form, these axes are perfectly in line with the seat support axis 101 and the base pivot axis 86. However, due to the nature of the gimbal joint-like attachment mechanism and the motion control assembly 22, these axes need not be necessarily co-linear. In other words, the motion control assembly comprising the pivot bar 90 and the base pivot attachment assembly 74 and the seat pivot attachment assembly 100 can be repositioned about a vertical axis in any orientation with respect to the longitudinal and lateral axes of the seat portion. The longitudinal and lateral axes 350 and 352, as shown in FIG. 8, are co-linear with the seat pivot axis 101 and the base pivot axis 86 where there is further an intersect point 354 showing the center of rotation of the motion control assembly 22. For reference purposes herein with respect to methods of aligning the spine, the longitudinal lateral axis need not be co-linear with these mechanical referenced axes 101 and 108.

There will now be a description of a method of straightening an individual spine's with reference to FIGS. 20-23. Whether an individual has cerebral palsy or is not inflicted with any spinal deformations, the apparatus described above is useful for providing a proper seating arrangement where mid-layer muscles take care of balancing without the need of conscious involvement of larger outer layer muscles to stay balanced upon the seating device. Present analysis indicates this leads to a stronger core and less fatiguing of the torso muscles. It should be further noted that because the pivot axes intersect point 120 is positioned relatively close to the lower portion of the hip bone such as the ischial tuberosities generally indicated at 404, the user's muscular system is adapted to assume a configuration that is better suited to the user's particular needs without the help of the outer layered muscles for balance. Present analysis further indicates that this behavior allows for the user to feel more comfortable and more innately safe and better suited to move in various directions which stimulate circulation, and provides other benefits than prolonged static seating.

Figure 20:
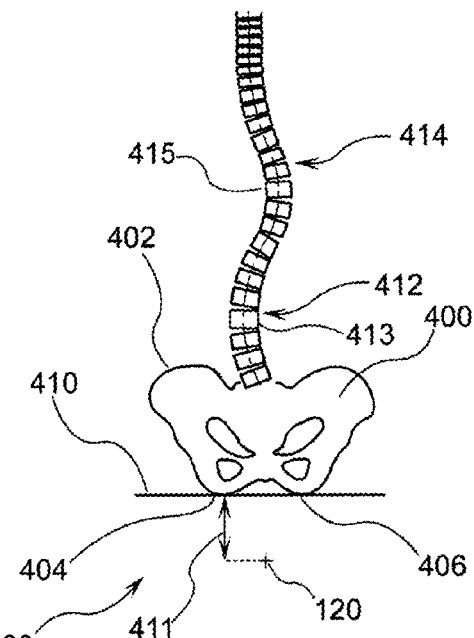
FIG. 20 shows an example of a misaligned spine sitting on a horizontal surface.

Now referring to FIG. 20, there is shown a pelvis or hip region 400 having an upper portion 402 and lower region such as near the ischial tuberosity 404. The ischial tuberosity 404 has a lower contact portion 406 which is adapted to engage the seat schematically indicated at 410. Of course the seat in one form is the upper surface of the seating portion 24 described above. FIG. 20 in general illustrates an example of a scoliotic curve when seating on a regular level device. As shown in FIG. 20, there is a strong left tilting primary curve in the lumbar region and a very strong compensatory secondary curve in the thoracic region. Further, in general the head is used to compensate for the primary and secondary curves where the head would say, for example, be tilted to the left (not shown). The lumbar region indicated at 412 is shown very schematically where the initial leanings are in a left direction. The secondary curve indicated at 414 at the thoracic region is shown as a typical compensatory curve. Now referring to FIG. 21, it can be seen by having a dynamic type seat 410 which tends to tilt in the direction of the primary curve, the compensatory curve region 414 is lessened. Present analysis and testing has also indicated that after sitting for approximately two hours on a seat insert operating on the principles as described above, the cerebral palsy patient shows no signs of fatiguing and sits somewhat more erect. It should be further noted that extensive use of the seating device having the same basic operating principles of the dampening system 160 and the motion control assembly 22 described above similar to that shown in FIG. 20 leads to significantly improved posture of the individual.

Figure 21:
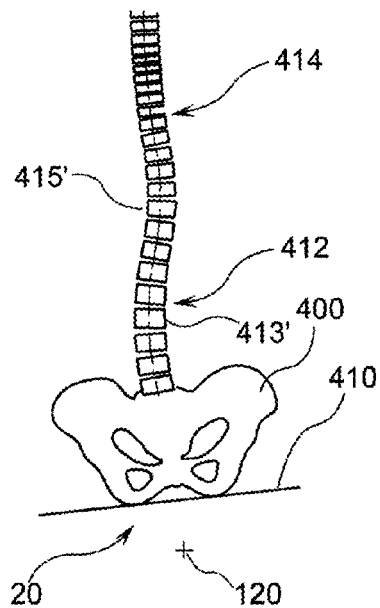
FIG. 21 shows a spine with a dynamic seating system allowing the spine adapt a straighter orientation.
Figure 23:
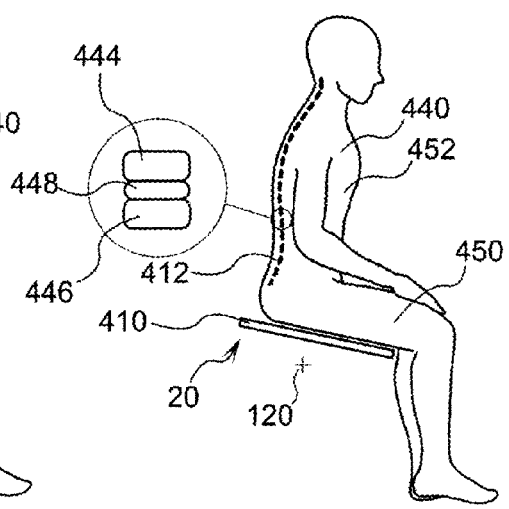
FIG. 23 shows a spine with a proper distribution of pressure thereupon the lumbar vertebrate.

As shown in FIG. 20, the muscles generally indicated at 415 as well as the muscles 413 are firing in disproportionate matters compared to the opposing lateral regions along the opposing lateral respective portions of the spine. Therefore, by allowing the natural hip adaptation as shown in FIG. 23, the relaxation of the muscles allows for the better posture. Because of the neurological impairment, these muscles, not illustrated but generally indicated at 413 and 415, are over-flexing, causing the distortion as shown in FIG. 20. By letting the hips naturally tilt as shown in FIG. 21, the general regions indicated at 413' and 415' can now relax and let the opposing lateral regions fire and create a straighter spine.

Figure 22:
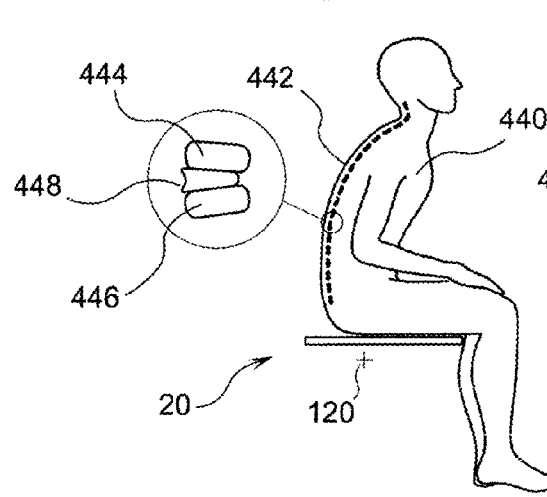
FIG. 22 shows a spine from a side profile view from a flat orientation with an individual having a slumped over posture.

Now referring to FIGS. 22 and 23, there is shown a side profile view along a lateral axis of an individual in a seated orientation. FIG. 22 shows an orientation where the individual 440 has a spine indicated at 442 and the callout shows upper and lower schematic spine members 444 and 446 where a center disc member 448 is interposed therebetween. As shown in the callout in FIG. 22, there is a tendency for unequal pressure along the disc member 448 when in a slouched position. Now referring to FIG. 23, the individual 440 on the seating device 410 is rotated somewhat forward. For example, the intersect point of the pivot axes indicated at 120 can be adjusted with respect to the orientation of the individual so the individual's center of gravity is, for example, slightly longitudinally forward of the point 120. Referring to the callout in FIG. 23, it can be seen how the vertebrae's schematically indicated 444 and 446 are more evenly distributed and the intermediate disc 448 has a more even distribution thereupon. More specifically, the femur region 450 has an angle of greater than 90° with respect to the chest region 452. Particularly in situations where an individual's hip and hamstring flexibility is less than optimal, this allows for a more desirable orientation of the lumbar vertebrae 412 in FIG. 23. It should be noted that the seating assembly 20 enables the upper body to move somewhat freely, leading to an increased amount of muscle activity and continuous loading and unloading upon the vertebrate discs 448. Present analysis indicates this has a positive effect of increased hydration and nutrient transport to the discs. Further, the lumbar and abdominal muscles, as well as the general core muscles, are activated leading to a greater feeling of well-being. Pure static seating with the total stable platform can have the undesirable effect where the neuromuscular servo that controls our posture does not receive the needed signals required to maintain a proper posture. No such signals equates to very little or no movement while sitting still which can lead to a lock up of the neuromuscular servo that can manifest into spasms of large back muscles. Therefore, these larger back muscles are triggered to keep the torso from collapsing. By way of background, the neuromuscular servo system controlling the human posture involves the cerebellum, the deep layer muscles connecting each vertebrate with the one next to it, the vestibular system and the visual system as sensors, the middle layer muscles connecting the femurs to the spine, the psoas major, the iliac crest to the spine, the quadratus lumborum and the abdominals, transverse abdominis, as well as other possible muscular and neurological systems. A neuromuscular servo failure can occur if many deep layer vertebrae interconnecting muscles misfires or "forgets" to fire. Failure of one of the deep layer muscles can be caused by sitting statically or sitting still for too long such as is often experienced in long car or airplane rides.

Therefore, a more dynamic seating environment is advantageous to supply continuous input from the appropriate (proprior) receptors to the cerebellum for healthy sitting which is not delivered from a static seating system. As shown in FIGS. 21 and 23, such a dynamic seating system can be advantageous where, for example, referring back to FIG. 20, in one form having the center pivot point of the motion control assembly at a distance indicated at 411 from the engagement portion of the hips indicated at 404 can be relatively close using the gimbal like joint as described above. In other words, the Gimbal-like joint allows the center of rotation to be fairly close to the hips. In one form, depending upon the seating cushion such as is shown in FIG. 1, the pivot/intersect point 120 can be within 3 inches of the ischial tuberosities of an individual. Of course, this distance can vary depending on the circumstance, ranging from say 2 inches to 4 inches, or it could be closer, perhaps ¾ of an inch to 2½ inches in a narrower range, for a closer distance between the rotation point of the seating device of the upper seat and the actual distance of the individual seated thereon.

Figure 24:
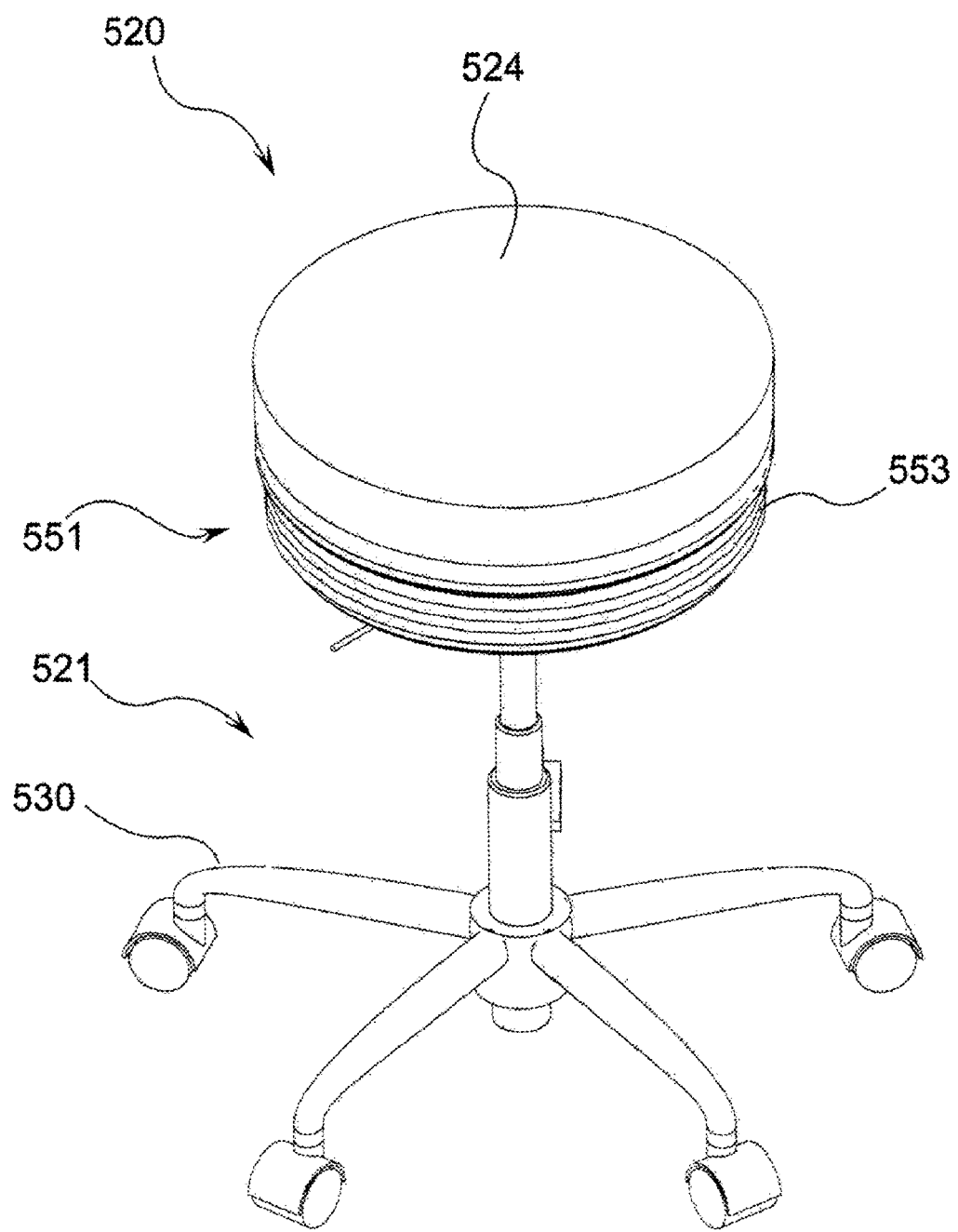
FIG. 24 shows an isometric view of another embodiment of the seating device.
Figure 25:
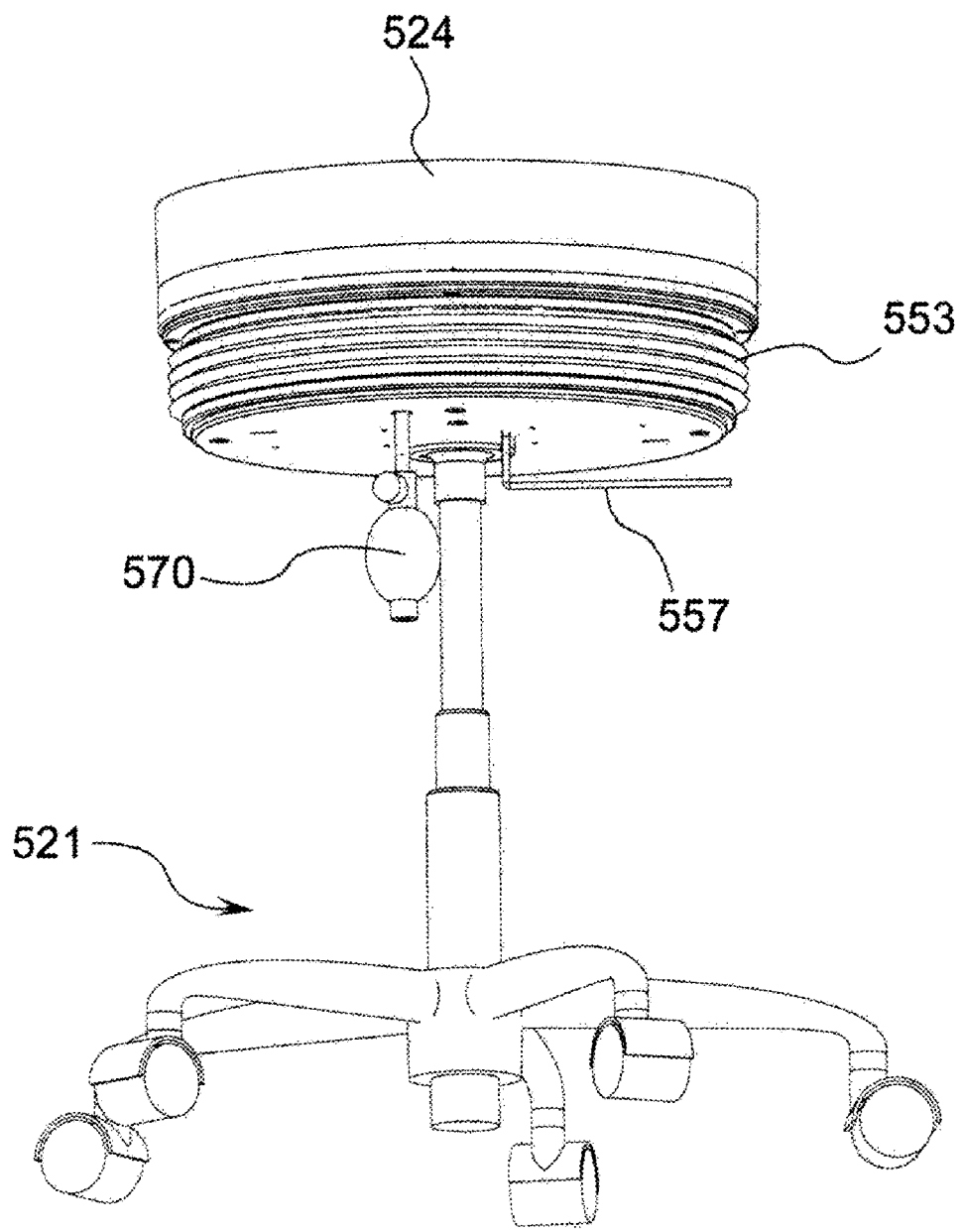
FIG. 25 shows an isometric view from a lower elevation level of the seating device as shown at FIG. 24.

As shown in FIG. 24 there is another variation of the seating device 520. In this form, the seating device operates under the general principles described above; however, it is more of a stool variant from the device as shown in FIG. 1. In general, this type of device also comprises a lower support 530, which in part comprises the overall support structure 521. In general, the seating device 520 also comprises a main assembly 551, which in one form is surrounded by the baffle-like shroud 553 as shown in FIGS. 24 and 25. Operatively attached to the main assembly 551 is a Gimbal-like joint very similar to that shown in FIGS. 14 and 17 above. The seat portion 524 is operatively attached to a seat pivot attachment which is a portion of the main assembly 551. Referring now to FIG. 25, it can be seen that the dampening system (which in one form is a toroidal), such as that shown at 160 in FIG. 14, is adjusted by the hand-pump-like mechanism 570. Further, the lever extension 571 can operate to raise and lower the stool in a manner which is conventional in the art.

Figure 26:
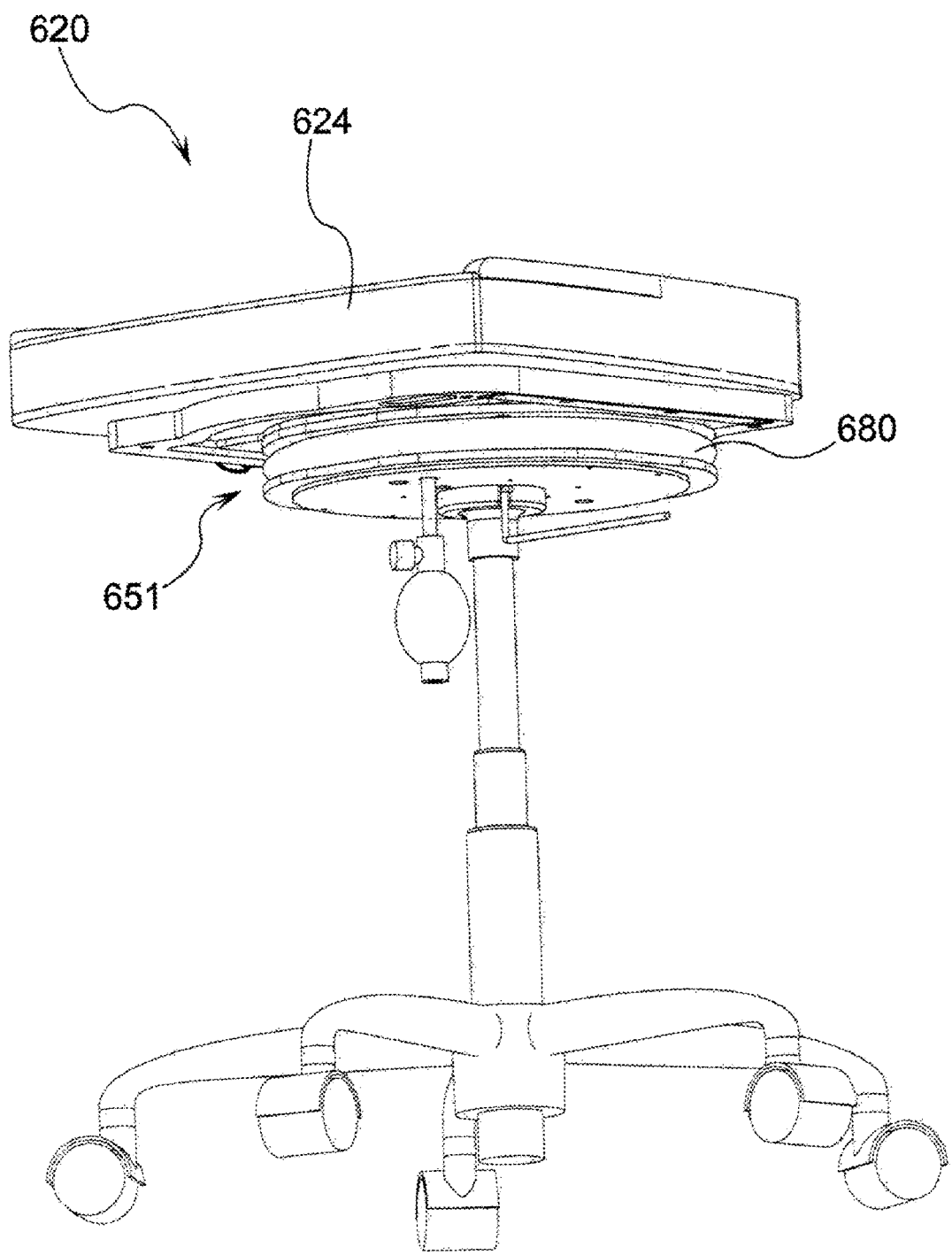
FIG. 26 shows an isometric view of another form of the seating device.

Now referring to FIG. 26, there is shown another embodiment 620 which is similar to the embodiments described above, where the main assembly 651 is shown in a partially exposed manner where the dampening system 680 is positioned in the perimeter region of the unit, and in one form comprises the toroidal shaped inflatable member. In this form, the seating portion 624 is repositioned with respect to the main assembly in a similar manner as described above with FIGS. 6-10. In this form, a backrest is not utilized and the item operates as a device that does not provide a support rest.

Figure 27:
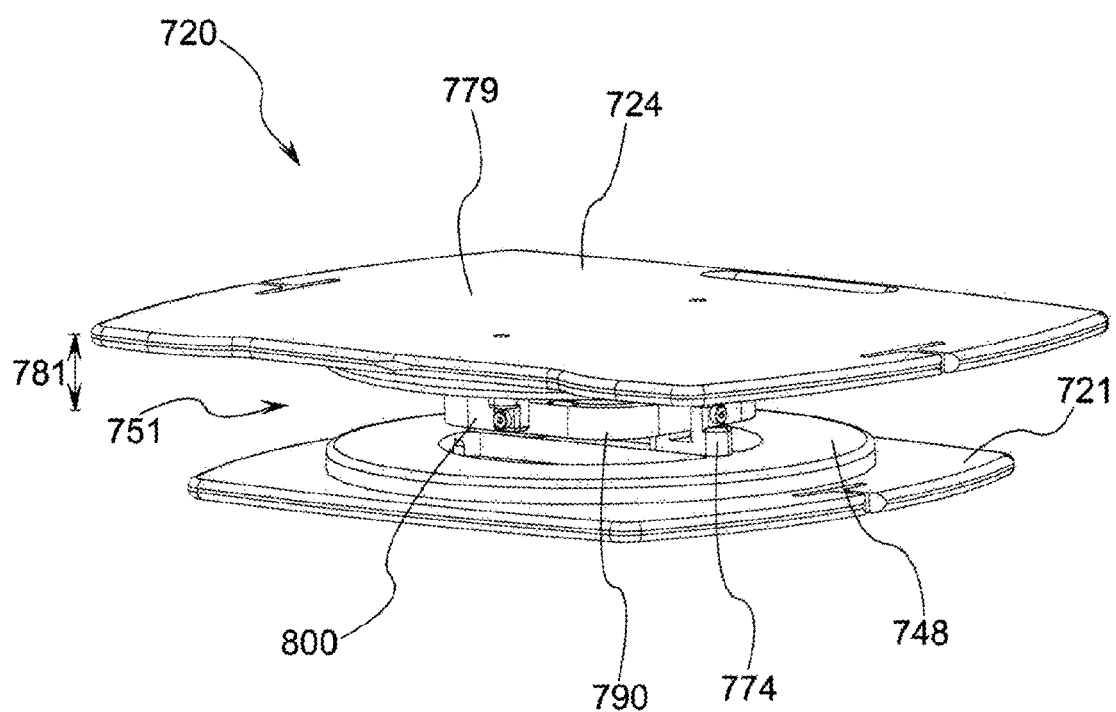
FIG. 27 shows another variation of a balance unit which can be utilized as a standing balance board or a balance board for other purposes.

Now referring to FIG. 27, there is shown an embodiment 720, which in this form can be a balance board type of arrangement. This embodiment has an upper platform 724 which can be seated or stood upon by an individual. The main assembly 751 operates in a similar manner as described above, where the pivot bar 790 is pivotally attached at a base pivot attachment assembly 774, and a second pivot attachment assembly 800 is attached to the moving reference of the pivot bar 790. Of course, in one form, a dampening system such as the toroidal-shaped inner tube shown in FIG. 14 at 160 can be positioned around the perimeter region above the support 748. It should be noted that this type of pivot attachment can be desirable where the intersect point between the pivot attachment assemblies 774 and 800 can be positioned relatively close to the upper surface 779 of the upper platform 724. Therefore, the strength and rigidity of the main assembly 751 allowing the pivoting action is maintained, and the net height of the unit such as that indicated by arrow 781 (which is the height from the intersection point, or substantially near the intersection point if they do not intersect perfectly) of the pivot attachment assemblies 774 and 800 and the upper surface 779 of the upper platform 724. It should be further noted that the joint arrangement defining the main assembly 751 (as well as the arrangements described above) does not allow for rotation, or in one form does not allow for rotation of the upper platform 724 with respect to the lower base member 721. In other words, as opposed to a ball-and-socket joint where the upper support can rotate about a vertical axis, the main assembly 751 (which in one form is comprised of a Gimbal-like joint) does not allow for such rotation about a vertical axis. However, if so desired, a bearing-like system can be employed between the upper platform 748 and the base member 721.

Of course, it should be noted that the unit similar to that shown in FIG. 27 (a preferred form having a dampening system utilized) can also be a seating device for a portable-like system, or further an item to be retrofitted to existing chairs or seating apparatuses. For example, such a unit could be manufactured at a sufficient dimension to be carried on an airplane or other means of transportation.

Figure 28:
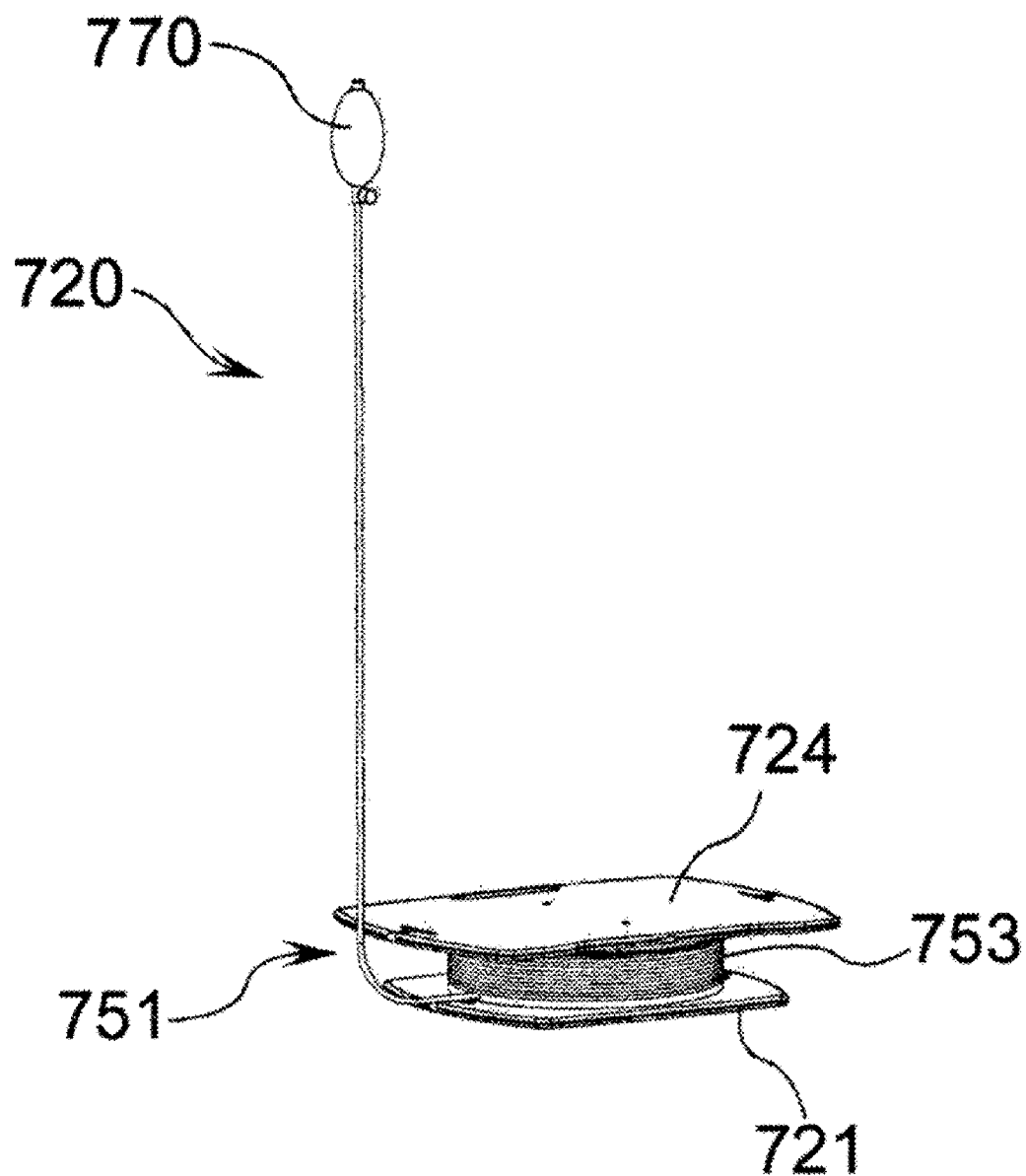
FIG. 28 shows the balance board with a dampening adjustment system.

Referring now to FIG. 28, there is shown one form of the embodiment 720, where a baffle-like shroud 753 is positioned around the dampening system contained therein. The hand pump or dampening adjustment mechanism 770 is positioned in a manner to adjust the amount of dampened resistance about the various rotations of the main assembly 751. In this form, the unit can be stood upon to work on balance, and other possible therapeutic aspects.

Figure 29:
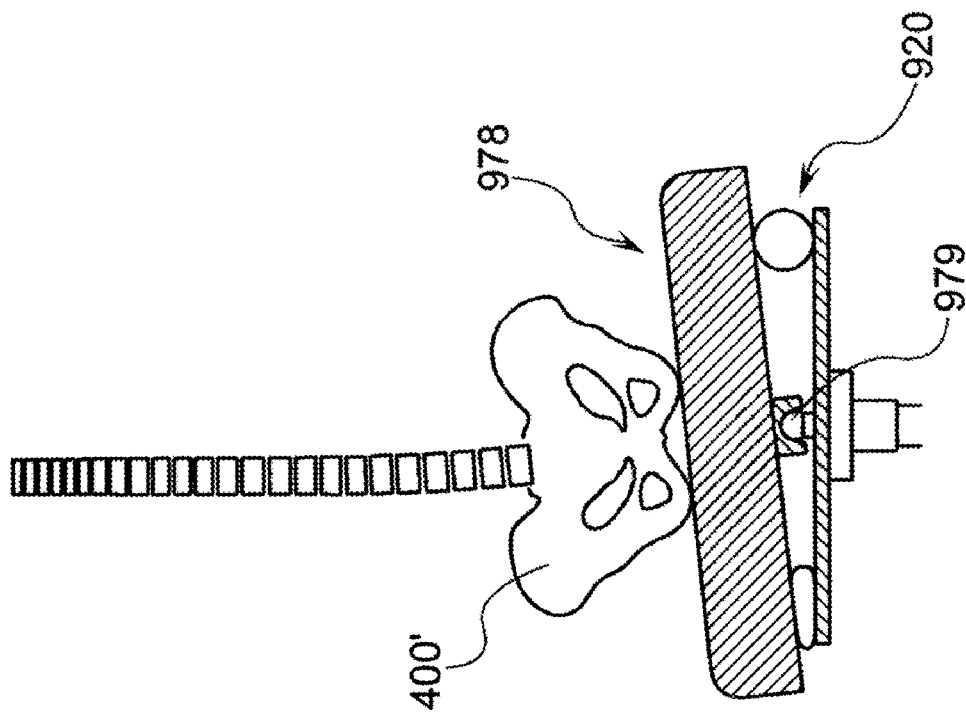
FIG. 29 shows an alternative motion control assembly where a ball-joint-like system is employed.
Figure 30:
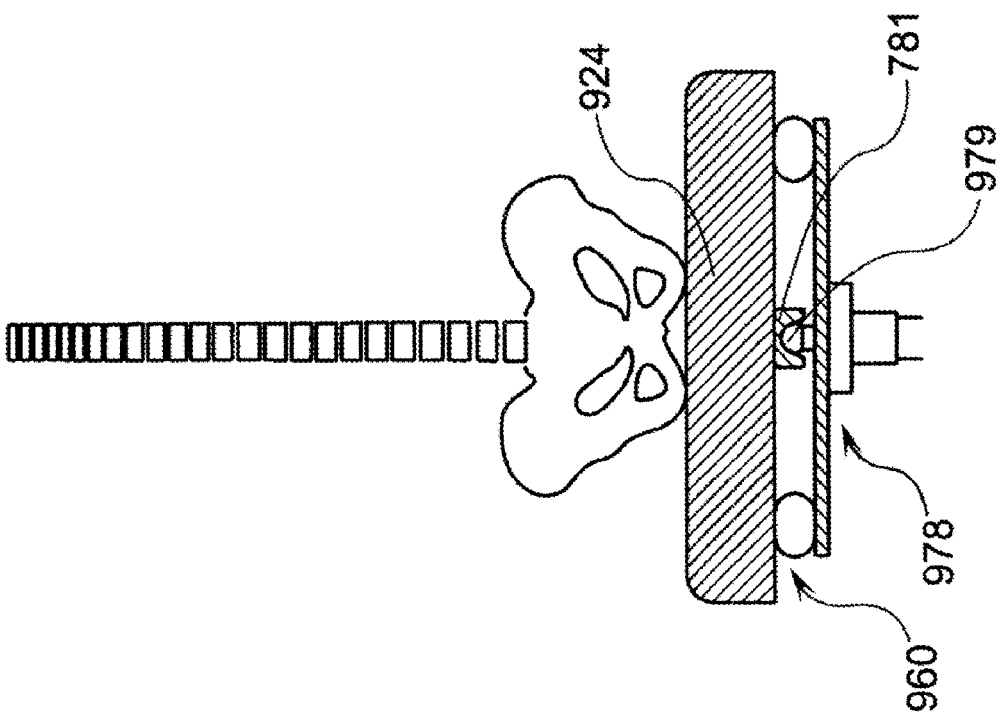
FIG. 30 shows the pelvis tilted about the motion control assembly.

As shown in FIG. 29, there is another embodiment of the seat pivot attachment system 978, which in one form has a spherical member 979 received within a concave recess portion 981 which is attached to the seat member schematically shown at 924. As shown in this figure, the seat pivot attachment system 978 is configured to freely reposition in the lateral direction as shown in FIG. 30, or in a forward direction in a similar manner as indicated in FIGS. 22 and 23. The dampening system 920 can be of a similar design as noted in other embodiments.

As further illustrated in FIG. 30, the center of rotation indicated at the spherical member 979 is positioned within the dampening system 920.

Figure 31:
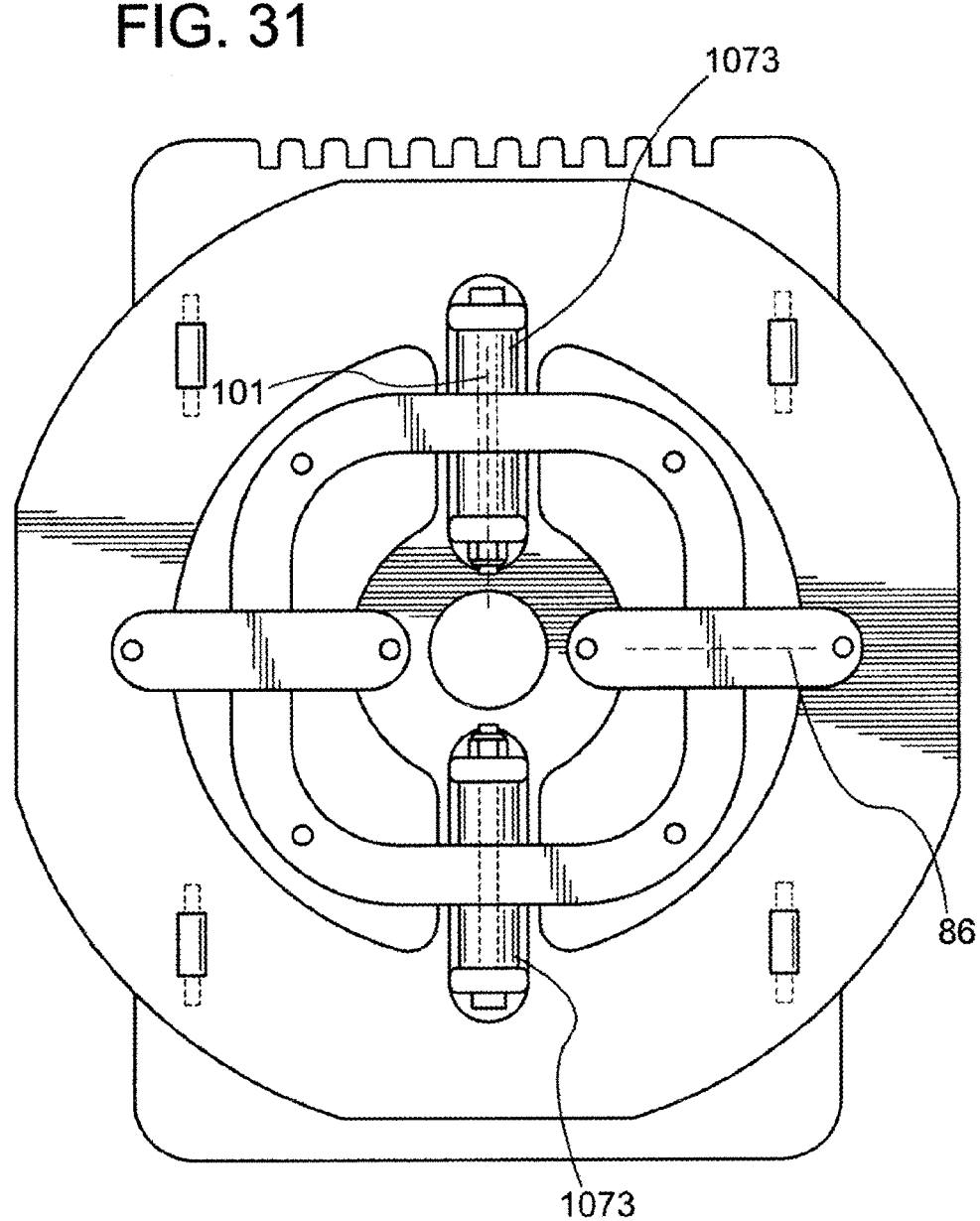
FIG. 31 shows an alternative dampening system having torsional members.

Now referring to FIG. 31, there is shown a type of dampening where torsional members 1073 are employed to resist rotation about the axis 101, thereby operating as a dampening system to resist rotation about the first and second axes. Of course, a similar type of dampening system can be employed for the axis 86.

Figure 32:
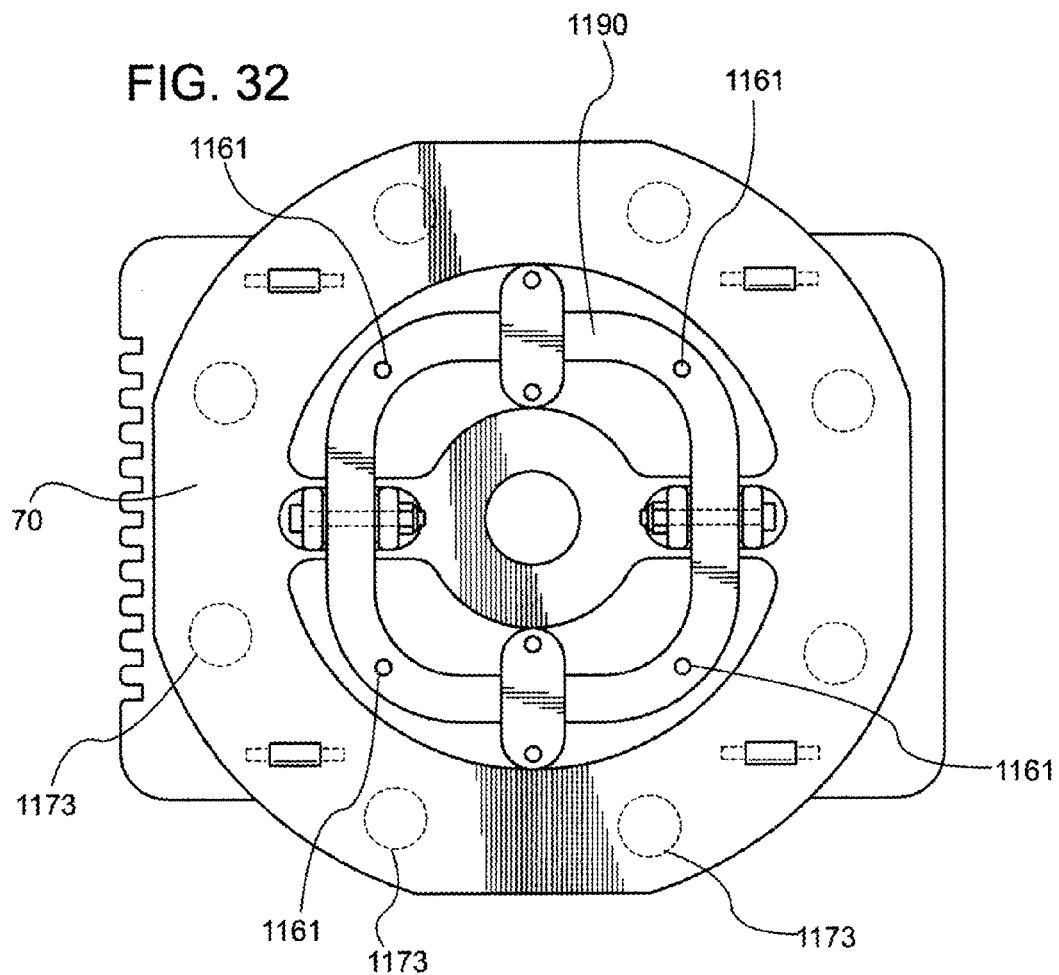
FIG. 32 shows an alternative dampening system having spring members.
Figure 33:
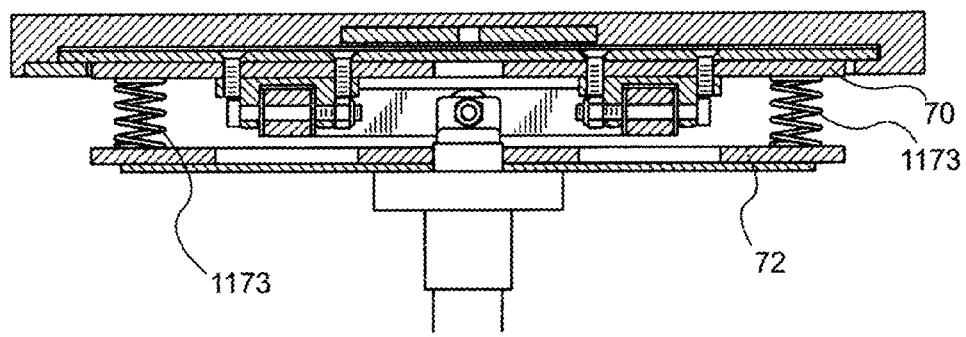
FIG. 33 shows an alternative dampening system in a cross-sectional view.

Now referring to FIGS. 32 and 33, there is shown another dampening system 1160 where, as shown in FIG. 33, there are a plurality of spring members 1173 positioned around the perimeter region in one form of the upper and lower dampening system supports 70 and 72. In other forms, the distance between the dampening supports 70 and 72 can be altered by way of an adjustment mechanism to alter the amount of resistance provided by the dampening system 1160.

In a similar manner, a dampening system similar to that shown in FIGS. 32 and 33 can be employed with, for example, spring-like members positioned outboard of the corner regions 1161 of the pivot bar 1190 in FIG. 32. For example, in one form, eight springs are positioned outboard of the corner regions 1161 of the pivot bar 1190 to provide resistance to dampen the degree of motion of the upper seat member attached to the seat pivot attachment system.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A seating assembly comprising:
a base support attached to a lower supporting structure,
a seating portion,
a pivot bar having axially aligned and oppositely disposed first pivots attached to the base support to pivot such that the pivot bar pivots about a base pivot axis and axially aligned and oppositely disposed second pivots oriented perpendicular to the first pivots and wherein the seating portion is pivotally attached to the second pivots such that the seating portion pivots about a seat pivot axis substantially orthogonal to the base pivot axis and wherein the base pivot axis and the seat pivot axis intersect, such that the seating portion is omnidirectionally tiltable out of a level plane, and wherein the pivot bar comprises a one piece construction;
a dampening assembly disposed between the base support and the seating portion to provide resistance to pivoting about the base pivot axis and the seat pivot axis.

2. The seating assembly as recited in claim 1 where the dampening assembly comprises a tubular member positioned around the pivot bar.

3. The seating assembly as recited in claim 2 where the tubular member comprises an inflatable toroidal shaped member.

4. The seating assembly as recited in claim 3 where the seating assembly is one of the following categories: a chair, a stool, or a wheelchair seat insert.

5. The seating assembly as recited in claim 1 where the seating portion comprises a lower seat and a backrest that movably engages the lower seat.

6. The seating assembly as recited in claim 5 where the lower seat pivotably engages the pivot bar.

7. A seating assembly comprising:
a base support attached to a lower support structure,
a base pivot attachment assembly attached to the base support,
a pivot bar having axially aligned and oppositely disposed first pivots attached to the base pivot attachment assembly such that the pivot bar is pivotable about a base pivot axis, and axially aligned and oppositely disposed second pivots oriented perpendicular to the first pivots, and wherein the pivot bar comprises a one piece construction,
a seating portion,
a seat pivot attachment assembly attached to the seating portion, the seat pivot attachment assembly being pivotally attached to the pivot bar second pivots such that the seating portion is pivotable about a seat pivot axis that is substantially orthogonal to the base pivot axis, and wherein the base pivot axis and the seat pivot axis intersect, such that the seat portion is omnidirectionally tiltable out of a level plane,
a rotational dampening system operatively connected between the base support and the seating portion, wherein the dampening system provides rotational resistance during pivoting about the seat pivot axis and the base pivot axis.

8. The seating assembly as recited in claim 7 where the base pivot attachment assembly is comprised of first and second base pivot attachment members.

9. The seating assembly as recited in claim 8 where the seat pivot attachment assembly is comprised of first and second seat pivot attachment members.

10. The seating assembly as recited in claim 7 where the seat pivot attachment assembly is attached to a support base which is rigidly attached to the seating portion.

11. The seating assembly as recited in claim 10 where the distance between the intersect point and the lower surface of the support base is less than 2 inches.

12. The seating assembly as recited in claim 10 where the dampening system is comprised of a circular tube interposed between the base support and the seating portion.

13. The seating assembly as recited in claim 7 where the seating portion has a backrest attached thereto.

14. The seating assembly as recited in claim 13 where the dampening system is comprised of an inflatable toroidal member positioned circumferentially around the pivot bar, and an inflation tube that allows adjustment of the volume of air within the toroidal member.

15. The seating assembly as recited in claim 7 where the seat pivot attachment assembly is comprised of first and second seat pivot attachment members which are positioned at one portion of the pivot bar and the base pivot attachment assembly is comprised of first and second base pivot attachment members positioned at substantially orthogonal locations with respect to the location of the first and second seat pivot attachment members.

16. A method of treating scoliosis comprising:
providing an individual suffering from scoliosis with a seating assembly comprising a seating portion, a base support and a pivot bar, wherein the pivot bar is pivotally attached to the seating portion with a seat pivot attachment assembly comprising oppositely disposed first pivots to pivot about a seat pivot axis, and is pivotally attached to the base support with a base pivot attachment assembly comprising oppositely disposed second pivots to pivot about a base pivot axis that is orthogonal to the seat pivot axis, the base support being attached to a support structure, and wherein the base pivot axis and the seat pivot axis intersect, such that the seat portion is omnidirectionally tiltable out of a level plane, wherein the pivot bar comprises a one-piece construction
positioning the individual suffering from scoliosis on the seating assembly such that the individual's center of gravity is directly over an intersection of the base pivot axis and the seat pivot axis,
wherein the seating assembly is adapted to produce a restoring force for rotation about the longitudinal axis and lateral axis to provide a sense of security for the individual.

17. The method of treating scoliosis of claim 16, wherein the restoring force for rotation about the axes is produced by a toroidal-shaped inflatable tube.

18. The method of treating scoliosis of claim 17, further comprising the step of selectively adjusting pressure in the inflatable tube thereby controlling the character of the restoring force.

19. The method of treating scoliosis of claim 16, wherein the restoring force increases nonlinearly with the magnitude of the rotation about the axes, thereby providing the sense of security for the individual.

20. A method for simulating therapeutic horseback riding in a seating assembly comprising:
providing a patient to receive simulated therapeutic horseback riding with a seating assembly comprising a seating portion, a base support and a pivot bar, wherein the pivot bar is pivotally attached to the seating portion with a seat pivot attachment assembly comprising oppositely disposed first pivots to pivot about a seat pivot axis, and is pivotally attached to the base support with a base pivot attachment assembly comprising oppositely disposed second pivots to pivot about a base pivot axis that is orthogonal to the seat pivot axis, the base support being attached to a support structure, and wherein the base pivot axis and the seat pivot axis intersect, such that the seat portion is omnidirectionally tiltable out of a level plane; wherein the pivot bar comprises a one-piece construction
providing a dampening system adapted to nonlinearly resist rotation of the seating portion about a longitudinal and lateral axis of the motion control assembly;
wherein an individual receiving the simulated horseback riding therapy is positioned such that the individual's center of gravity is directly over an intersection of the base pivot axis and the seat pivot axis; and
wherein the dampening system provides a nonlinear restoring force for rotation about the longitudinal axis and lateral axis to provide a sense of security for the individual.

21. The method for simulating therapeutic horseback riding of claim 20, wherein the dampening system is a pneumatic system.

22. The method for simulating therapeutic horseback riding of claim 20, wherein the method is applied to treating scoliosis.

23. A method of treating sensory motor processing disorders comprising:
positioning an individual suffering from a sensory motor processing disorder on a seating assembly comprising a seating portion, a base support and a pivot bar, wherein the pivot bar is pivotally attached to the seating portion with a seat pivot attachment assembly comprising oppositely disposed first pivots to pivot about a seat pivot axis, and is pivotally attached to the base support with a base pivot attachment assembly comprising oppositely disposed second pivots to pivot about a base pivot axis that is orthogonal to the seat pivot axis, the base support being attached to a support structure, and wherein the base pivot axis and the seat pivot axis intersect, such that the seat portion is omnidirectionally tiltable out of a level plane, wherein the pivot bar comprises a one-piece construction
providing a rotational dampening system to resist rotation about a longitudinal and lateral axis of the motion control assembly,
positioning the individual toward a position wherein the individual's center of gravity is directly over an intersection of the base pivot axis and the seat pivot axis,
wherein the rotational dampening system produces a restoring force for rotation about the longitudinal axis and lateral axis.

24. The method of treating sensory motor processing disorders of claim 23, wherein the step of providing a restoring force for rotation about the axes comprises a toroidal-shaped inflatable tube.

25. The method of treating sensory motor processing disorders of claim 24, further comprising the step of selectively adjusting pressure in the inflatable tube thereby controlling the character of the restoring force.

26. The method of treating sensory motor processing disorders of claim 23, wherein the restoring force increases nonlinearly with the magnitude of the rotation about the axes, thereby providing the sense of security for the individual.

* * * * *

UNITED STATES PATENT AND TRADEMARK OFFICE
CERTIFICATE OF CORRECTION

| | | |
|---|---|---|
| PATENT NO. | : 7,686,396 B2 | Page 1 of 1 |
| APPLICATION NO. | : 11/610724 | |
| DATED | : March 30, 2010 | |
| INVENTOR(S) | : H. Schaaf | |

It is certified that error appears in the above-identified patent and that said Letters Patent is hereby corrected as shown below:

| COLUMN | LINE | ERROR |
|---|---|---|
| 19 (Claim 1, | 57 line 5) | "the base support to pivot such that" should read --the base support such that-- |
| 19 (Claim 1, | 60 line 8) | after "first pivots" insert --,-- |

Signed and Sealed this

Twenty-second Day of June, 2010

David J. Kappos
*Director of the United States Patent and Trademark Office*